US010846637B2

(12) United States Patent
Beye et al.

(10) Patent No.: US 10,846,637 B2
(45) Date of Patent: Nov. 24, 2020

(54) IDENTIFICATION SENSOR FOR COMMUNICABLE LINKAGE WITH COMPETITIVE PROPOSAL SYSTEM

(71) Applicant: BANK OF AMERICA CORPORATION, Charlotte, NC (US)

(72) Inventors: Ricki A. Beye, Lambertville, NJ (US); Karrin A. Russo, Robbinsville, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 955 days.

(21) Appl. No.: 15/133,617

(22) Filed: Apr. 20, 2016

(65) Prior Publication Data
US 2017/0308833 A1 Oct. 26, 2017

(51) Int. Cl.
G06Q 10/06 (2012.01)
G06Q 10/08 (2012.01)

(52) U.S. Cl.
CPC ..... G06Q 10/06315 (2013.01); G06Q 10/087 (2013.01)

(58) Field of Classification Search
None
See application file for complete search history.

(56) References Cited

U.S. PATENT DOCUMENTS

| 7,464,053 | B1 | 12/2008 | Pylant |
| 9,865,000 | B1 | 1/2018 | Lopez et al. |
| 2003/0160698 | A1* | 8/2003 | Andreasson ........ G06F 19/3462 340/573.1 |
| 2004/0193460 | A1 | 9/2004 | Ducholet et al. |
| 2012/0078727 | A1* | 3/2012 | Lee ........................ G06Q 30/02 705/14.66 |
| 2014/0086177 | A1 | 3/2014 | Adjakple et al. |

(Continued)

OTHER PUBLICATIONS

Son, Sanga., Design of Smart Shopping Application Using Barcode Scanning and Location Based Coupon Service, 2015, 8th International Conference on Grid and Distributed Computing, Graduate School of Software, Soongshil University (Year: 2015).*

Primary Examiner — Arif Ullah
(74) Attorney, Agent, or Firm — Michael A. Springs; Moore & Van Allen PLLC; Nicholas C. Russell

(57) ABSTRACT

Embodiments of the invention are directed to a system, method, or computer program product for an identification sensor system providing real-time item negotiation information and merchant inventory communication and management. A user selects items at a merchant location and positions them inside a communication enabled container communicably linked with a user device and a merchant inventory system. Information related to the items positioned within the container such as resource amount for the item, offers associated with the item, and manufacturer information associated with the item is extracted from the inventory system and relayed to the user. Upon the container passing through a communication enabled merchant gate device, the identification sensor system transmits collected information related to the items within the container, triggers a communicable linkage to determine a preferred resource to provide a total resource amount required by the merchant, and requires the transmission of the preferred resource to the merchant.

20 Claims, 12 Drawing Sheets

(56) References Cited

U.S. PATENT DOCUMENTS

| | | | |
|---|---|---|---|
| 2014/0164176 A1* | 6/2014 | Kitlyar | G06Q 30/0633 705/26.8 |
| 2014/0279509 A1* | 9/2014 | Khilnani | G06Q 20/227 705/44 |
| 2014/0310155 A1 | 10/2014 | Postrel | |
| 2014/0324627 A1* | 10/2014 | Haver | G06Q 30/0639 705/26.9 |
| 2015/0058146 A1 | 2/2015 | Gaddam et al. | |
| 2015/0356662 A1* | 12/2015 | Poole | G06Q 30/0633 705/14.25 |
| 2018/0040042 A1 | 2/2018 | Platzker et al. | |

\* cited by examiner

```
                    ┌─────────────────────────────────────────────┐
                    │ GENERATE USER-SPECIFIC COMPETITIVE PROPOSAL PROFILE │
                    │                      602                    │
                    └─────────────────────────────────────────────┘
                                        │
                    ┌─────────────────────────────────────────────┐
                    │  PUSH USER PROFILE TO USER TO ACQUIRE USER PREFERENCES │
                    │                      604                    │
                    └─────────────────────────────────────────────┘
                                        ▼
                    ┌─────────────────────────────────────────────┐
                    │     RECEIVE USER PREFERENCES FROM USER PROFILES    │
                    │                      606                    │
                    └─────────────────────────────────────────────┘
                                        ▼
                    ┌─────────────────────────────────────────────┐
                    │   IDENTIFY USER ACCOUNTS AND RESOURCE MANAGERS    │
                    │           ASSOCIATED WITH THE ACCOUNTS      │
                    │                      608                    │
                    └─────────────────────────────────────────────┘
                                        ▼
                    ┌─────────────────────────────────────────────┐
                    │  IDENTIFY HISTORIC TRENDS ASSOCIATED WITH USER ACCOUNTS │
                    │                      610                    │
                    └─────────────────────────────────────────────┘
                                        ▼
                    ┌─────────────────────────────────────────────┐
                    │ GENERATE USER-SPECIFIC COMPETITIVE PROPOSAL PROFILE │
                    │   BASED ON COLLECTED PREFERENCES, TRENDS, AND │
                    │           ASSOCIATED RESOURCE MANGERS       │
                    │                      612                    │
                    └─────────────────────────────────────────────┘
                                        ▼
                    ┌─────────────────────────────────────────────┐
                    │  STORE USER-SPECIFIC COMPETITIVE PROPOSAL PROFILE WITH │
                    │           USER PREFERENCES ON CLOUD         │
                    │                      614                    │
                    └─────────────────────────────────────────────┘
                                        ▼
                    ┌─────────────────────────────────────────────┐
                    │   ALLOW USER TO MODIFY USER-SPECIFIC COMPETITIVE   │
                    │       PROPOSAL PROFILE ON USER DEVICE       │
                    │                      616                    │
                    └─────────────────────────────────────────────┘
```

IDENTIFICATION SENSOR FOR COMMUNICABLE LINKAGE WITH COMPETITIVE PROPOSAL SYSTEM

BACKGROUND

Stocking a wide variety of items at a merchant location requires a merchant to maintain an accurate inventory. Quickly identifying, locating, and processing items is pivotal to efficiently maintaining the quality and the proper quantity of inventory at a merchant location while promoting patron satisfaction and preventing patron attrition.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for an identification sensor system that allows for inventory item identification and information extraction while managing inventory in real-time.

In some embodiments, the invention provides an identification sensor system for real-time inventory identification, communication, and management. The invention identifies items placed inside a communication enabled container. In some embodiments, the identification is performed by communicating with and extracting information from an inventory system. The inventory system may comprise a database with information about items, such as the identity of products sold by a merchant. This information may include a price, quantity in stock, promotional offers, or the like associated with the product. The sensor system associated with the container may communicate with a user device to, in conjunction, maintain a total resource amount required by a merchant for purchasing all of the items selected by a user and placed within the confines of the container. Upon completion of the user's shopping experience at a merchant location, the user may pass through a merchant gate area. The gate may be located at or near an exit of the merchant location. Based on the user passing through a merchant gate device, the invention triggers a communicable linkage with a competitive proposal system which generates a ranked list of resources, such as credit cards, debit cards, or the like that the user may utilize to complete the transaction with the user. In this way, the user is able to complete a transaction with the merchant without having to check-out at a traditional kiosk or check-out line. The transaction completion is triggered based on the container carrying items crossing the gate. As such, this invention improves the physical aspects of completing a transaction for multiple products at a merchant location by reducing the check-out time for a customer, while also reducing the cost associated with the check-out process for the merchant.

Embodiments of the invention relate to systems, methods, and computer program products for an identification sensor system providing real-time communication and management, the invention comprising: generating a communication enabled container containing an identification sensor; linking, upon triggering of identification of the communication enabled container being within a merchant location, the communication enabled container with a user device associated with a user; scanning, upon an item being positioned within the communication enabled container, one or more identifiers associated with the item via the identification sensor; extracting item information associated with the item from an inventory system based on an identification of the one or more identifiers matching item identifiers stored in a database on the inventory system, wherein the item information comprises a resource amount for the item, offers associated with the item, and manufacturer information associated with the item; identifying, based on extracted item information, the item positioned within the communication enabled container; displaying, in real-time via a display on the user device, a total resource amount required by the merchant for all of the items in the communication enabled container; identifying the communication enabled container passing through a merchant gate device; triggering a communicable linkage for determining a preferred resource to provide the total resource amount required by the merchant; and requiring, based on triggering the communicable linkage for determining the preferred resource, a transmission of the preferred resource to the merchant to provide the total resource amount required by the merchant.

In some embodiments, triggering the communicable linkage for determining a preferred resource to provide the total resource amount required by the merchant further comprises: identifying user resources and one or more resource managers associated with the identified user resources; generating a user-specific competitive proposal profile, wherein the user-specific competitive proposal profile comprises user resources, user preferences, historic resource trends, and resource manager terms for resource use; triggering a communicable linkage with the one or more resource managers based on receiving a determined total resource amount required by a merchant; opening the communicable linkage with the one or more resource managers for resource manager term change proposals for providing the total resource amount to the merchant; receiving term change proposals from the one or more resource managers through the communicable linkage; generating a ranked list of resources from the one or more resource managers for providing the total resource amount to the merchant, wherein the ranked list of resources further comprise an order of preferred term changes relative to the user preferences; transmitting the ranked list of resources from the one or more resource managers to the user device; and allowing user selection of one of the ranked list of resources for providing the total resource amount to the merchant.

In some embodiments, extracting item information associated with the item from the inventory system further comprises: generating a database of store inventory, wherein the database contains information related to items maintained by the merchant at a merchant location such as a number of items currently in stock, location of the items, prices of the items, manufacturer information associated with the items, and/or offers associated with the items; generating a communicable linkage with the communication enabled container; receiving from the communication enabled container an indication of the item being placed in the communication enabled container; updating, based on receiving the indication of the item being placed in the communication enabled container, the database of store inventory; receiving from the communication enabled container an indication of the item being removed from the communication enabled container; and updating, based on receiving the indication of the item being removed from the communication enabled container, the database of store inventory.

In some embodiments, updating the store inventory further comprises identifying from the database of store inventory that stock of a particular item has fallen below a predetermined threshold and ordering automatically, based on identifying from the database of store inventory that the stock of the particular item has fallen below the predetermined threshold, more of the particular item.

In some embodiments, receiving from the communication enabled container an indication of the item being removed from the communication enabled container comprises receiving a GPS location of the communication enabled container associated with the location that the item is removed.

In some embodiments, extracting item information associated with the item from the inventory system further comprises: extracting one or more offers associated with the item from the inventory system; presenting the one or more offers associated with the item to the user via the user device; allowing the user to select one of the one or more offers via the user device; and applying a user-selected offer to the total resource amount required by the merchant.

In some embodiments, presenting the one or more offers associated with the item to the user via the user device comprises presenting the total resource amount required by the merchant to the user in an audio format via speakers or headphones associated with the user device.

In some embodiments, displaying the total resource amount required by the merchant in real-time via a user device comprises presenting the total resource amount required by the merchant to the user in an audio format via speakers or headphones associated with the user device.

In some embodiments, requiring a transmission of the preferred resource to the merchant to provide the total resource amount required by the merchant comprises prompting the user to select the preferred resource from a ranked list of resources on a user device.

In some embodiments, requiring a transmission of the preferred resource to the merchant to provide the total resource amount required by the merchant comprises automatically, after a pre-determined period of time, selecting the preferred resource to provide the total resource amount if the user does not select a resource from the ranked list of resources in a predetermined amount of time.

In some embodiments, the merchant gate device is also a merchant point-of-transaction device.

In some embodiments, the one or more identifiers comprise a barcode, UPC, SKU, information associated with a RFID enabled tag, and/or GPS location.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
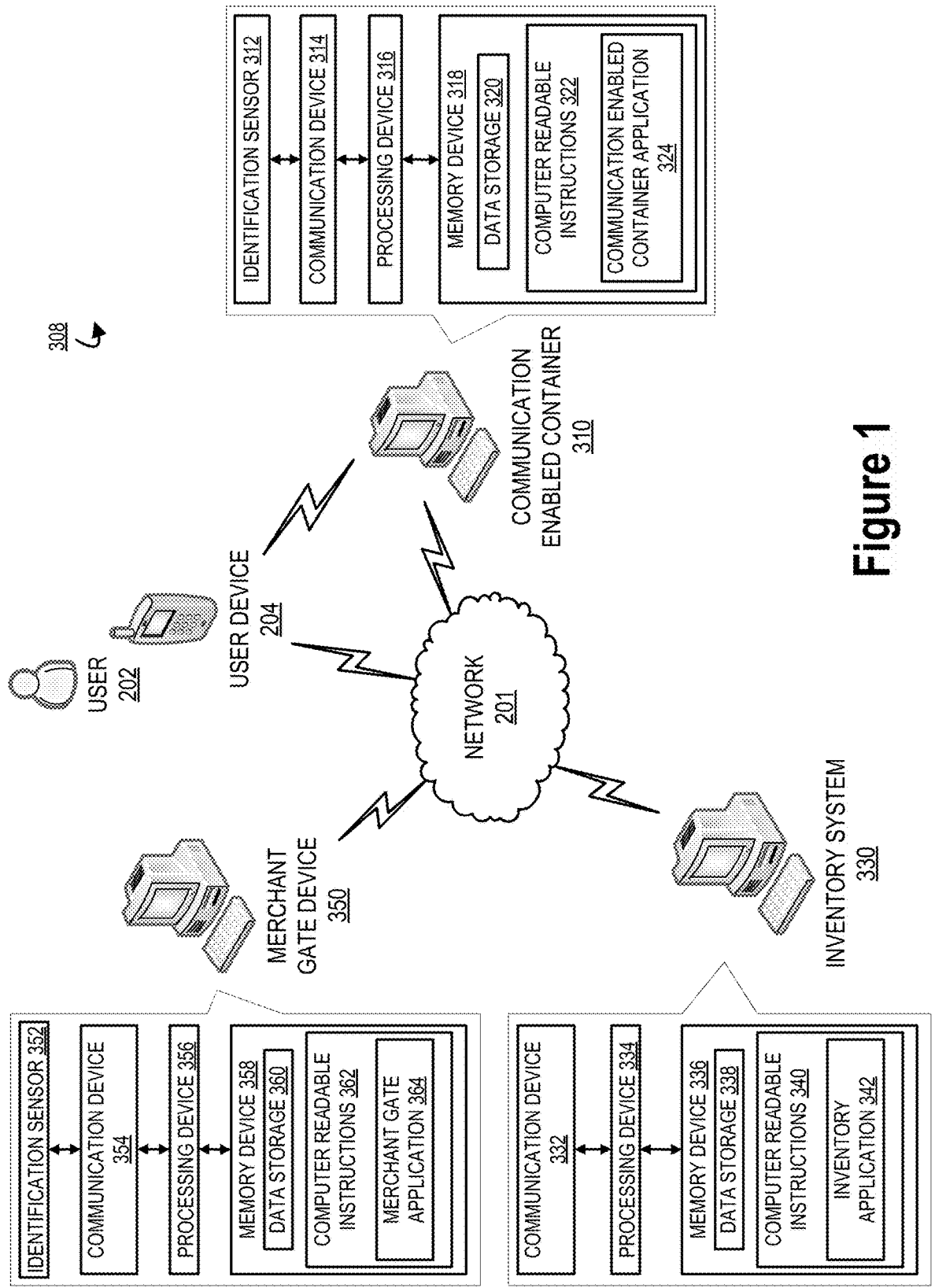
Figure 2:
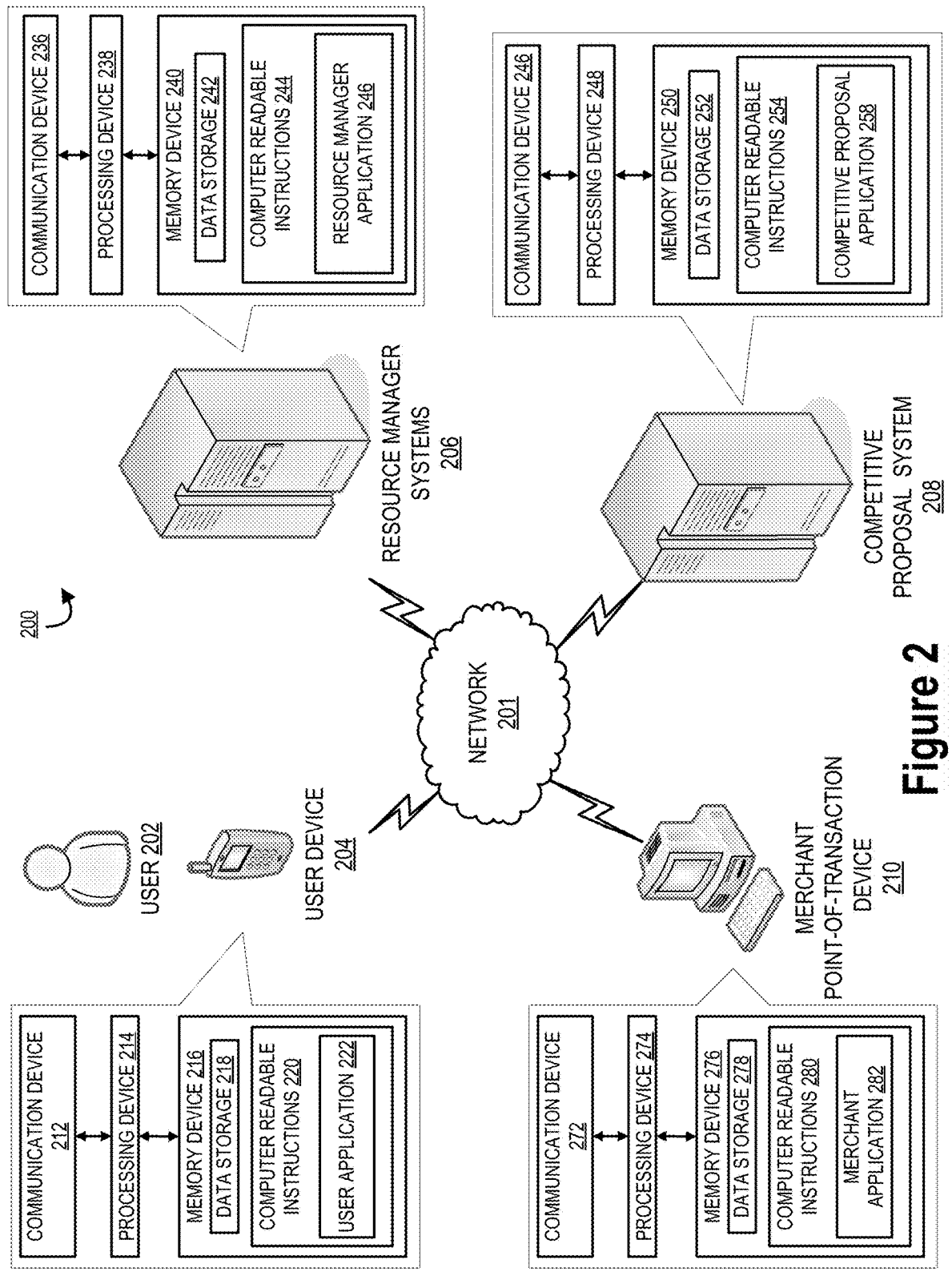
Figure 3:
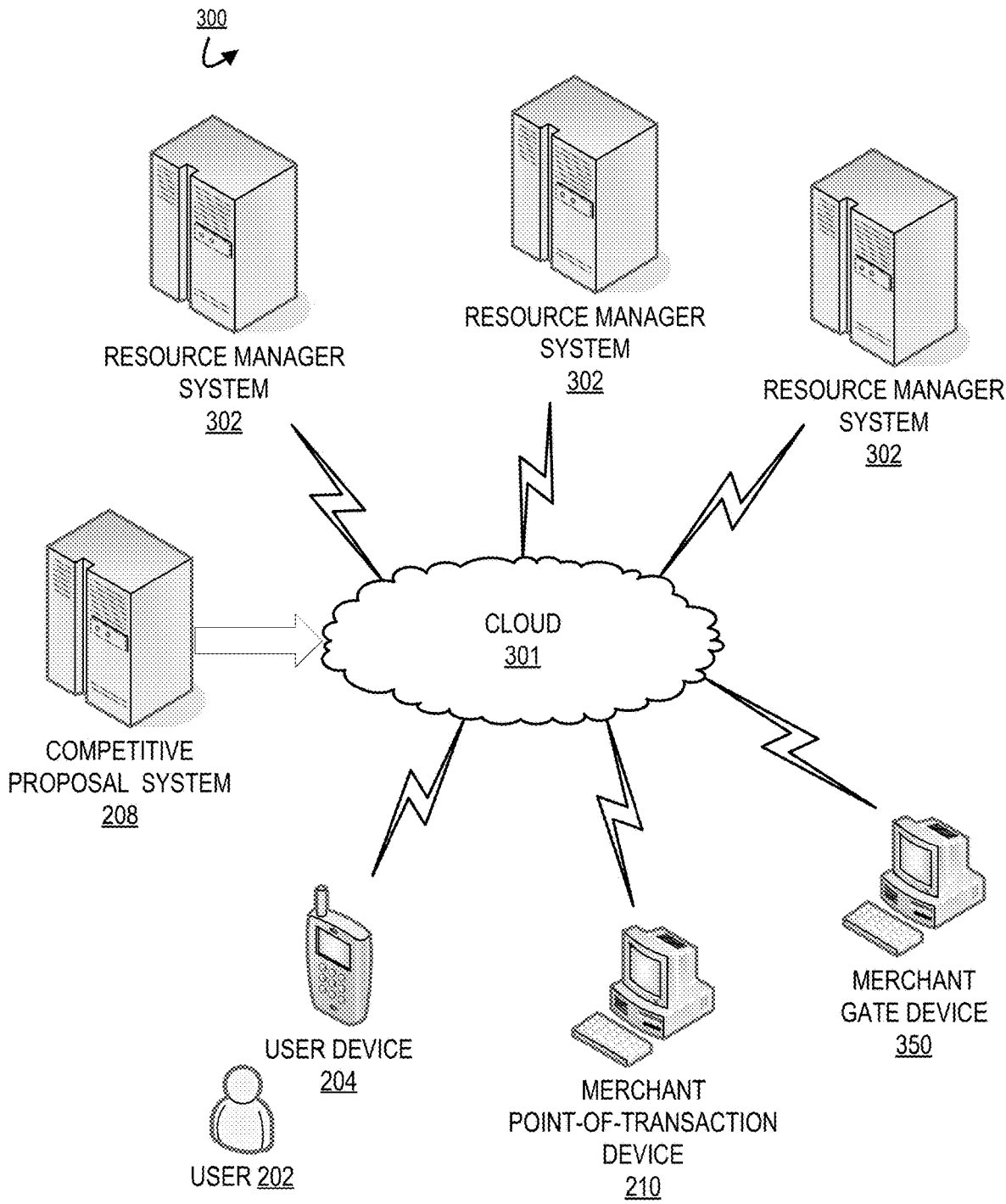
Figure 4:
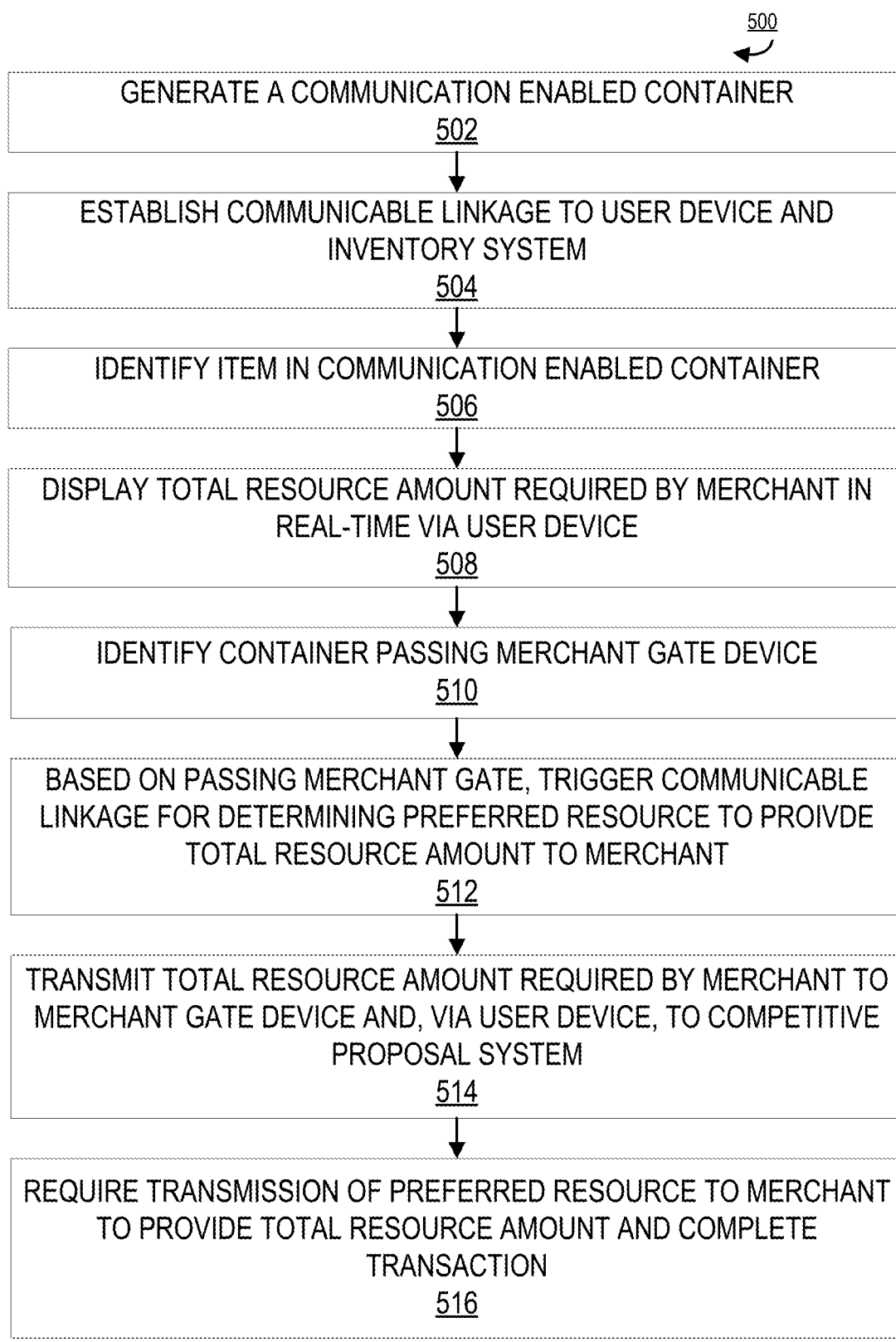
Figure 5:
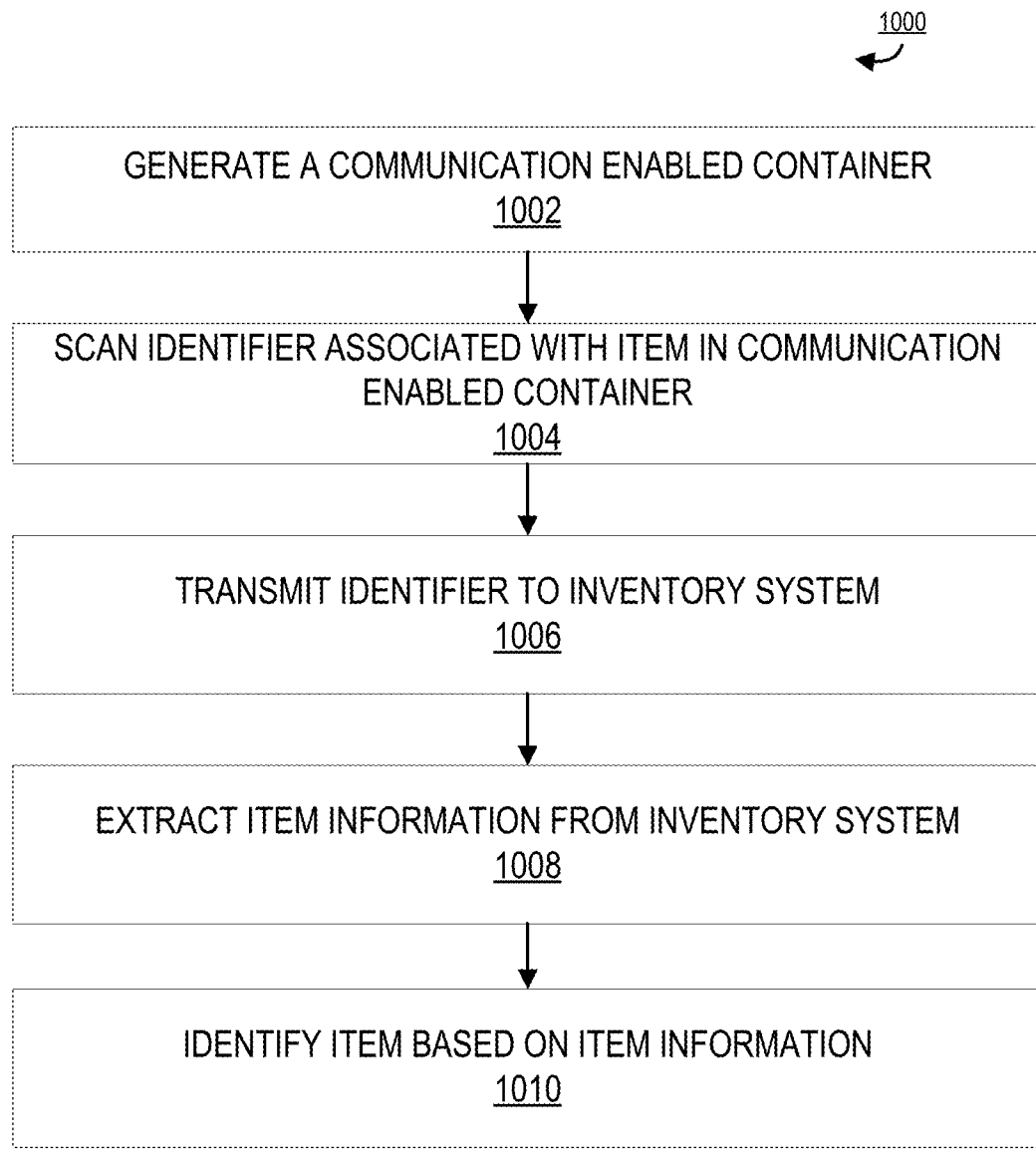
Figure 6:
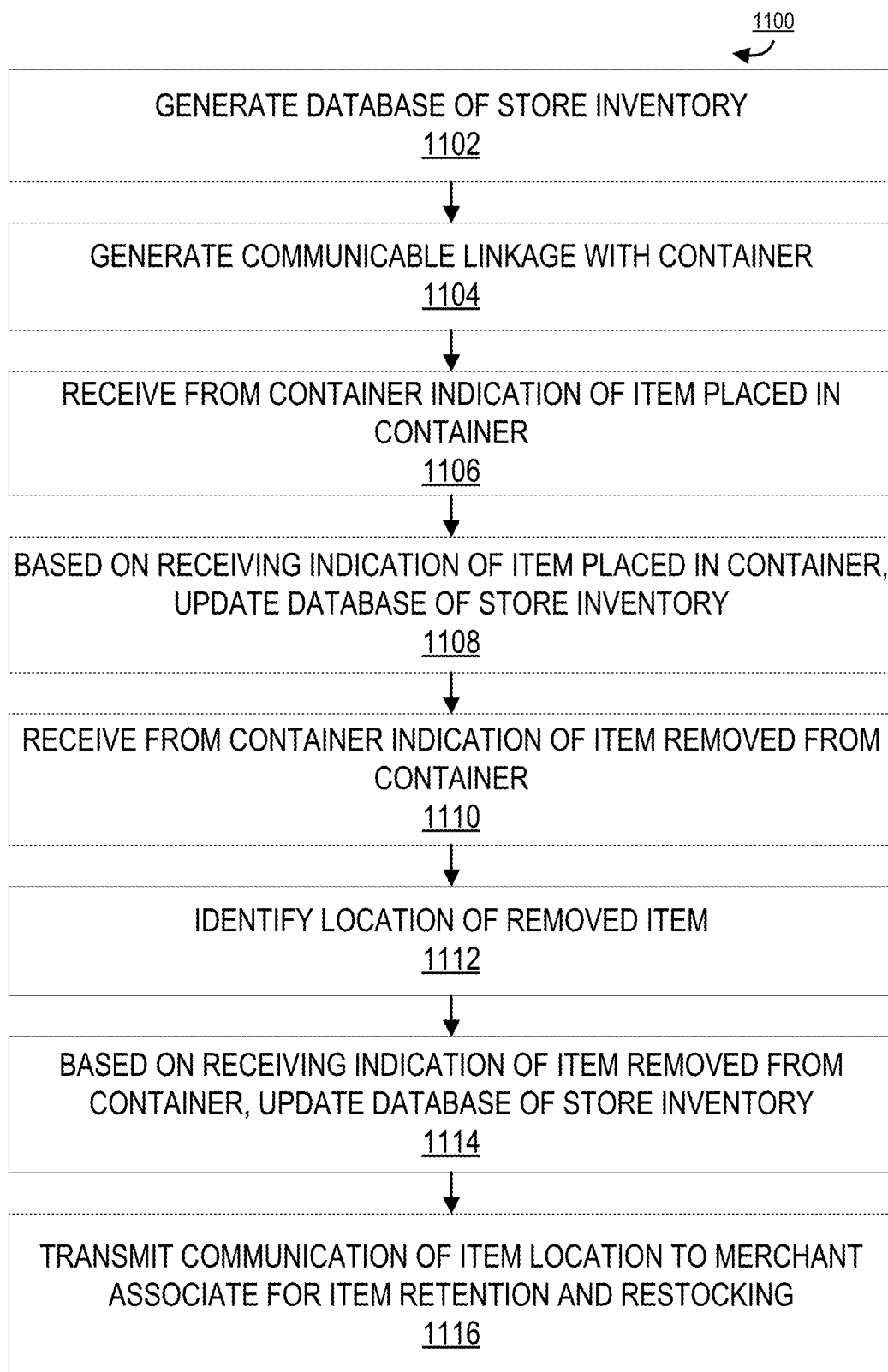
Figure 7:
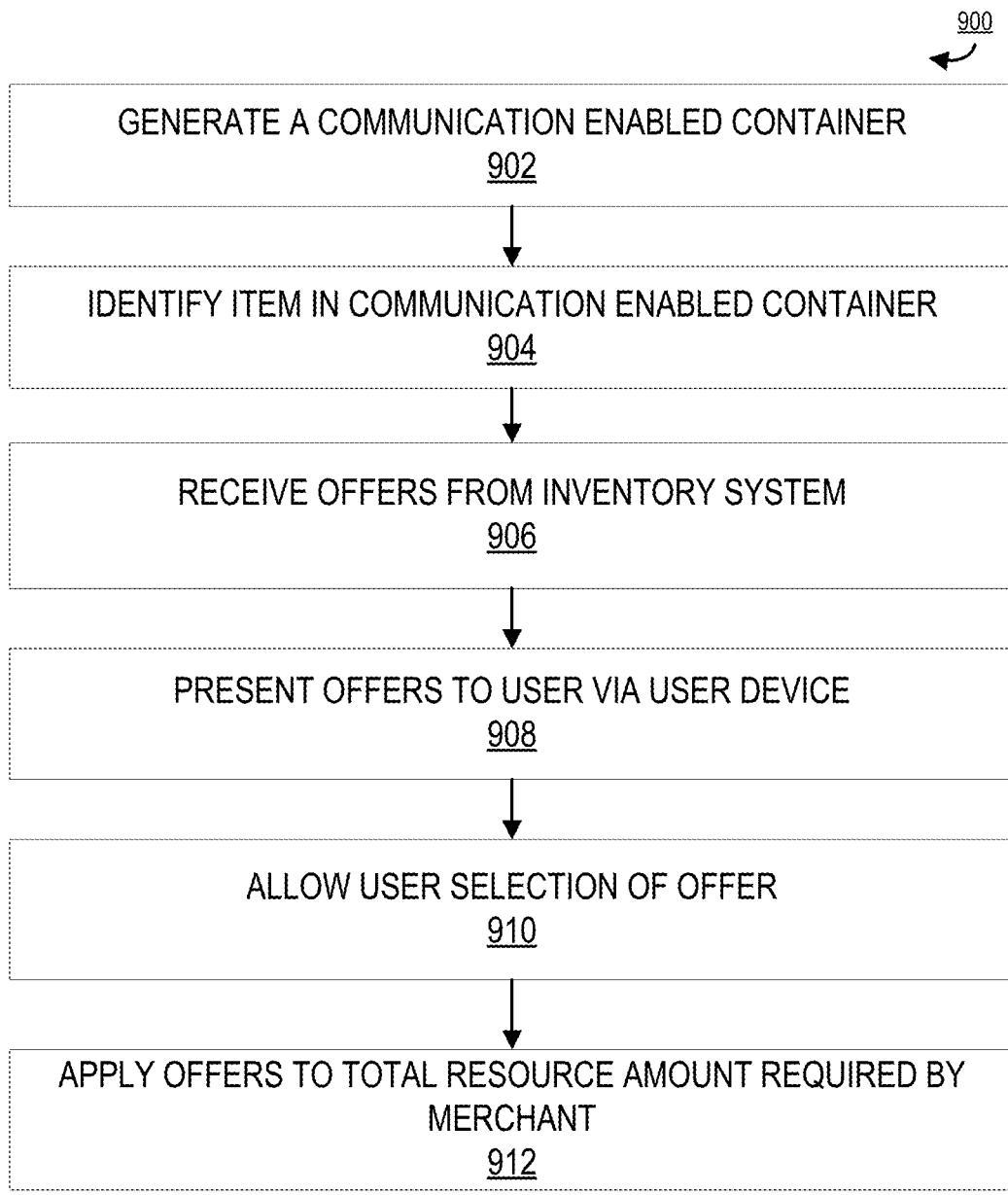
Figure 8:
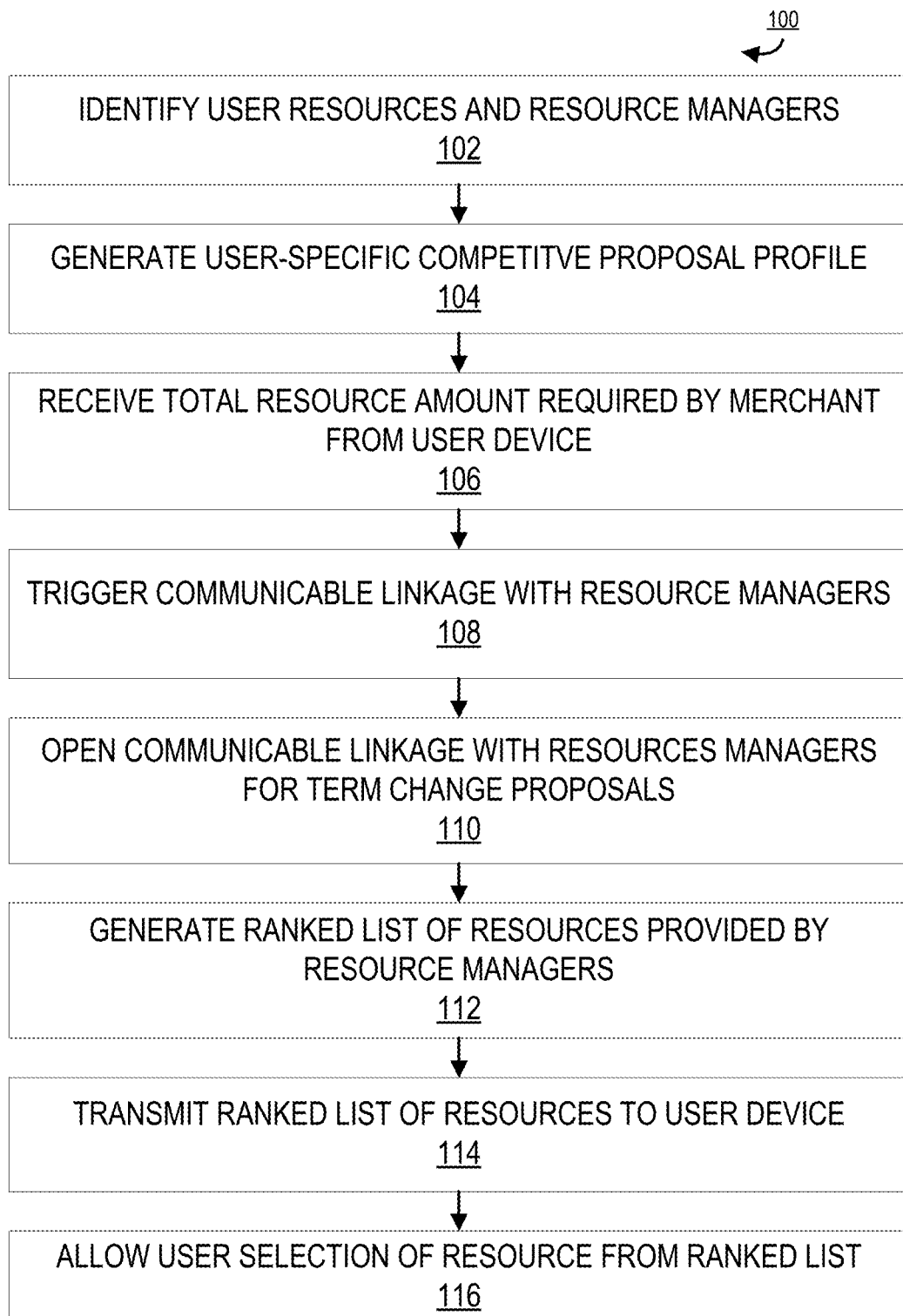
Figure 10:
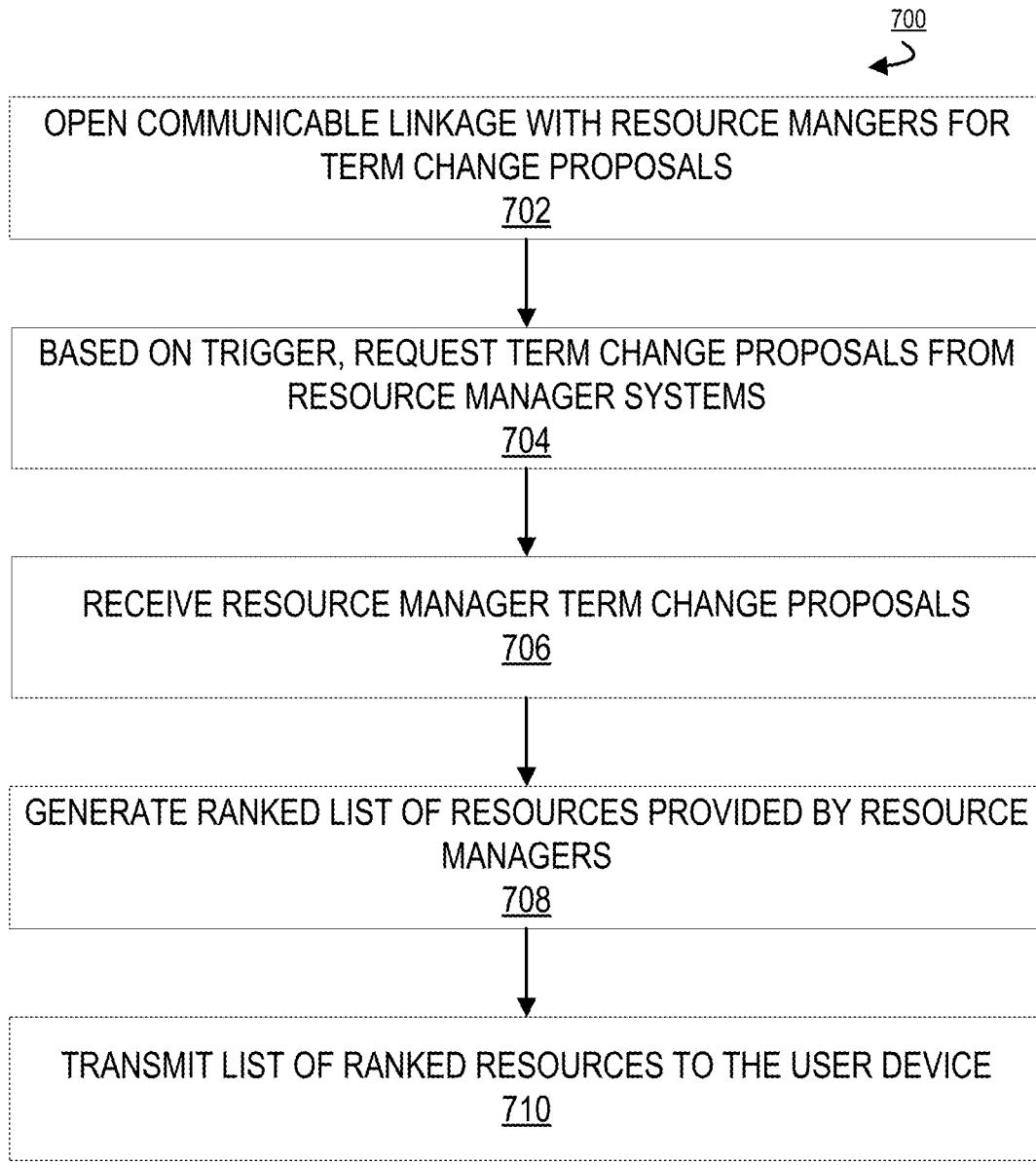
Figure 11:
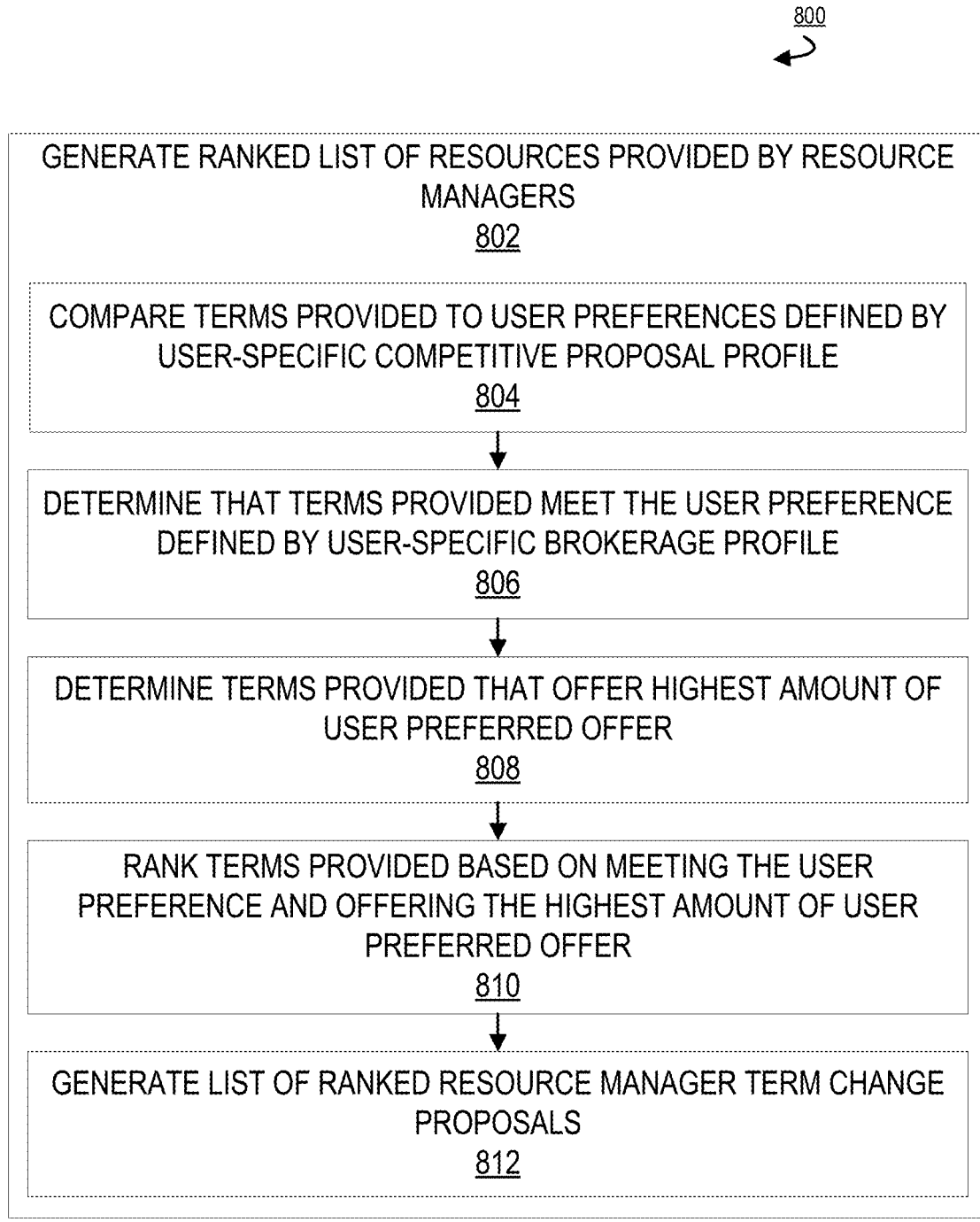
Figure 12:
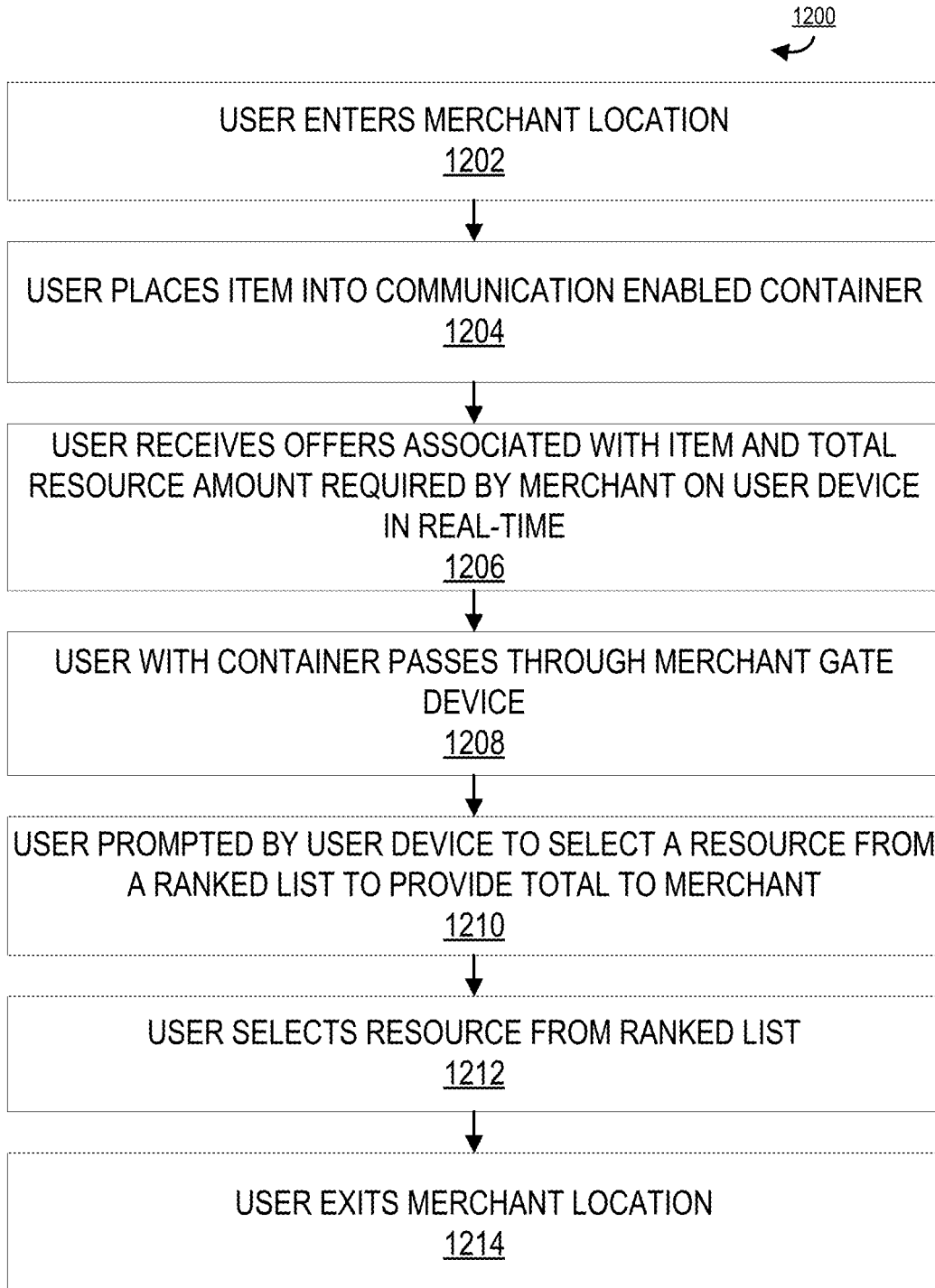

Having thus described embodiments of the invention in general terms, reference will now be made to the accompanying drawings, wherein:

FIG. 1 provides an identification sensor system environment, in accordance with one embodiment of the invention;

FIG. 2 provides a competitive proposal system environment, in accordance with one embodiment of the invention;

FIG. 3 provides a cloud-based competitive proposal system environment, in accordance with one embodiment of the invention;

FIG. 4 provides a high level process flow illustrating item identification and processing, in accordance with one embodiment of the invention;

FIG. 5 provides a high level process flow illustrating retrieving identifying information associated with an item, in accordance with one embodiment of the invention;

FIG. 6 provides a high level process flow illustrating inventory management and retention, in accordance with one embodiment of the invention;

FIG. 7 provides a high level process flow illustrating identification of items and retrieval of associated offers, in accordance with one embodiment of the invention;

FIG. 8 provides a high level process flow illustrating implementation of a competitive proposal system, in accordance with one embodiment of the invention;

FIG. 9 provides a high level process flow illustrating generation of a user-specific competitive proposal profile, in accordance with one embodiment of the invention;

FIG. 10 provides a high level process illustrating opening a communicable linkage with resource managers in detail, in accordance with one embodiment of the invention;

FIG. 11 provides a high level process illustrating generating a ranked list of resources, in accordance with one embodiment of the invention; and FIG. 12 provides a high level process flow illustrating user interaction with the communication enabled container system.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, as used herein the term "user device" may refer to mobile phones, personal computing devices, tablet computers, wearable devices, and/or any portable electronic device capable of receiving and/or storing data therein.

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user profile that includes information associated with the user, or the like. The account is associated with and/or maintained by the entity. A "resource" is an account of the user, and/or a payment device associated with an account of the user. Examples of resources may be accounts that have cash or cash equivalents, a credit card and associated credit card account, a debit card and associated banking account, or accounts that are funded with or contain property, such as safety despots box account that jewelry, a trust account that is funded with property, or the like.

A "transaction" refers to any communication between a user and the financial institution or other entity monitoring the user's activities. A transaction may refer to a physical or virtual purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

An "item" as used herein may refer to a product produced by a manufacturer and provided for sale by a merchant at a merchant location to be included in a transaction between a merchant and a customer.

A "merchant location" as used herein may refer to a physical brick and mortar store location operated by a merchant, wherein a transaction between a merchant and a customer may take place. A "merchant location" may also refer to an online store located at a web address, wherein a transaction between a merchant and a customer may take place.

Embodiments of the present invention address the above needs and/or achieve other advantages by providing apparatuses (e.g., a system, computer program product and/or other device) and methods for an identification sensor system for real-time transaction completion and inventory management. The present invention improves the process of a user completing a transaction with a merchant by instantly and continuously providing a pre-calculated total resource amount required by the merchant via sensor recognition of items or products placed in a user's container and directs the amount to a merchant point-of-transaction device along with information associated with all items included in the total without requiring for items to be individually scanned by a cashier. This reduces the time required for the transaction to be completed and increases merchant efficiency and customer satisfaction. The shopping experience of the user is also improved by allowing the user to view a total resource amount required by the merchant while shopping and to receive offers related to items selected for purchase in real-time. Additionally, inventory management and retention for the merchant is improved by allowing for real-time tracking of items selected for purchase or returned by customers.

FIG. 1 illustrates an identification sensor system environment 308, in accordance with one embodiment of the present invention. As illustrated in FIG. 1, a communication enabled container 310 is operatively coupled, via a network 201 to a user device 204, an inventory system 330, and a merchant gate device 350. In this way, the communication enabled container 310 can send and receive information to and from the user device 204, inventory system 330, and merchant gate device 350. In some embodiments, the communication enabled container 310 may communicate directly with the user device 204 without use of the network 201 by way of near field communication (NFC) or other wireless communication technology.

FIG. 1 illustrates only one example of an embodiment of the system environment 308, and it will be appreciated that in other embodiments, one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual acting as a customer and selecting items provided by a merchant at a merchant location to be included in a transaction between the user 202 and the merchant. In some embodiments the user 202 completes the transaction with the merchant using a resource managed by a resource manager.

FIG. 1 also illustrates a user device 204 which is described in further detail below with respect to FIG. 2.

As further illustrated in FIG. 1, the communication enabled container 310 generally comprises one or more identification sensors 312, a communication device 314, a processing device 316, and a memory device 318. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 316 is operatively coupled to the one or more identification sensors 312, the communication device 314, and the memory device 318. The communication enabled container 310 may include an identification sensor 312 to provide information related to readable indicia associated with scanned items to the inventory system 330 in order to identify the item by extracting information associated with the item from the inventory system 330 and displaying it via the user device 204. Such an identification sensor 312 may include, but is not limited to a magnetic strip reader, a bar code scanner, a radio frequency (RF) reader, a character recognition device, a magnetic ink reader, an NFC reading device, a processor for interpreting codes presented over an electrical or optical medium, a biometric reader, a wireless receiving device, computer chip, and/or the like. The processing device 316 uses the communication device 314 to communicate with the network 201 and other devices on the network 201, such as, but not limited to the user device 204, merchant inventory system 330, and merchant gate device 350. As such, the communication device 314 generally comprises a modem, server, or other device for communicating with other devices on the network 201. As further illustrated in FIG. 1, the communication enabled container 310 comprises computer-readable instructions 322 stored in the memory device 318, which in one embodiment includes the computer-readable instructions 322 of a communication enabled container application 324. In some embodiments, the memory device 318 includes data storage 320 for storing data related to the system environment 308, but not limited to data created and/or used by the communication enabled container application 324.

The processing device 316 is configured to use the communication device 314 to transmit data, such as data corresponding to items placed in the container. The processing device 316 stores the data that it receives in the memory device 318.

In the embodiment illustrated in FIG. 1 and described throughout much of this specification, the communication enabled container application 324 may communicate with the inventory system 330 and identify items placed within and removed from the communication enabled container 310, display, in real-time, a total resource amount required by a merchant, provide offers associated with items selected by the user 202, identify the communication enabled container 310 passing through a merchant gate device 350, and establish a communicable linkage with a competitive proposal system 208 via a user device 204 in order to use a selected resource to complete a transaction.

In some embodiments, the communication enabled container application 324 first generates a communication enabled container 310, wherein the communication enabled container 310 comprises a receptacle with integrated computer technology such as a processing device 312, memory device 318, communication device 314 and/or the like along with one or more identification sensors 312 used for collecting information related to items placed in the communication enabled container 310.

In some embodiments, the communication enabled container application 324 establishes a communicable linkage to the user device 204 and inventory system 330 over the network 201 allowing for the transmission of information between the devices. The communication enabled container application 324 triggers the communicable linkage upon identifying that the user 202 with the communication enabled container 310 is located within the merchant location as determined by the communication enabled container 310 being within a range of the merchant location as to allow the communication enabled container 310 and the inventory system 330 to communicate via the network 210. In some embodiments, the location of the communication enabled container 310 is determined by GPS. In some embodiments, the communication enabled container 310 and user device 204 may communicate directly using NFC or similar forms of wireless communication without the use of the network 201.

In some embodiments, the communication enabled container application 324 identifies one or more items placed into the communication enabled container 310. After establishing a communicable linkage to the user device 204, the communication enabled container application 324 uses the one or more identification sensors 312 to scan the one or more items placed into the communication enabled container 310 for one or more identifiers associated with each item, wherein the one or more identifiers may be a barcode, a universal item code (UPC), a stock keeping unit (SKU), information associated with a radio frequency identification (RFID) enabled tag, GPS location, and/or the like.

In some embodiments, the communication enabled container application 324 transmits over a network 201 via the communication device 314 the one or more identifiers associated with the one or more items in the communication enabled container 310 to the inventory system 330 for identification. The one or more identifiers associated with the one or more items are used to identify each item from a merchant inventory database stored in the memory device 336 and maintained by the inventory system 330. In some embodiments, the inventory system is maintained and operated by the merchant. In other embodiments of the invention, the inventory system 330 is maintained, stored, and operated by a separate third party and not by the merchant.

In some embodiments, the communication enabled container application 324 extracts item information related to the one or more items in the communication enabled container 310 from the inventory system 330, wherein item information comprises price, offers, manufacturer information, and/or the like associated with the one or more items. The communication enabled container 310 receives the item information over the network 201 and uses the item information to identify the one or more items in the communication enabled container 310. The item information associated with the items is stored in the memory device 318 of the communication enabled container 310.

In some embodiments, after identifying the item, the communication enabled container application 324 uses the communication device 314 to transmit and present to the user 202 the prices of the one or more items in real-time as a total resource amount required by the merchant via the user device 204. The total resource amount required by the merchant is displayed on the user device 204 via a graphical user interface. In some embodiments, the total resource amount is presented to the user as audio played through speakers or headphones associated with the user device 204.

In some embodiments, the communication enabled container application 324 identifies that the communication enabled container 310 passes through the merchant gate device 350 after the user 202 has finished selecting items and adding them to the communication enabled container 310. The communication enabled container application 324 identifies the proximity of the merchant gate device 350 through wireless communication such as NFC, RFID, or the like. In some embodiments of the invention, the communication enabled container 310 includes a GPS locating device, wherein the location of the communication enabled container 310 within the merchant location is determined by GPS and is used to determine the proximity of the communication enabled container 310 to the merchant gate device 350.

Based on the communication enabled container 310 passing through the merchant gate device 350, the communication enabled container application 324 triggers a communicable linkage with the competitive proposal system via the user device 204 to determine a preferred resource to provide the total resource amount required by the merchant. The communicable linkage is generated to allow the communication enabled container 310 to transmit and receive information to and from the competitive proposal system via the user device 204 over the network 201.

In some embodiments, the communication enabled container application 324 uses the established communicable linkage to transmit the total resource amount required by the merchant over the network 201 to the competitive proposal system to allow for resource manager bidding, further illustrated below in FIG. 2. Additionally, the communication enabled container application 324 transmits the total resource amount to the merchant gate device 350 over the network 201 or through other forms of wireless communication. The merchant gate device 350 uses an identification sensor 352 to scan the one or more items in the communication enabled container 310 and confirm the total resource amount transmitted by the communication enabled container application 324.

In some embodiments, the communication enabled container application 324 requires the transmission of the preferred resource to provide the total resource amount to the merchant and complete the transaction. The preferred resource is received over the network 201 from the competitive proposal system 208 via the user device 204 and is pushed by the user device 204 to the merchant for completion of the transaction. In some embodiments, the user device 204 may push the resource to the communication enabled container 310. In some embodiments, the user device 204 may push the resource to the merchant gate device 350. In some embodiments, the user device 204 may push the resource to the merchant point-of-transaction device. In other embodiments, the competitive proposal 208 may push the referred resource directly to the merchant via the merchant point-of-transaction device and/or the merchant gate device.

In some embodiments of the invention, the preferred resource is automatically selected to provide the total resource amount required by the merchant without any input from the user 202. In other embodiments, the user 202 is prompted by the user device 204 to select a resource from a ranked list of resources to provide the total resource amount required by the merchant and complete the transaction. In yet another embodiment of the invention, the preferred resource is automatically selected to provide the total resource amount to the merchant if the user 202 does not select a resource from the ranked list of resources in a predetermined amount of time, such as within 1 hour after the user 202 has walked out of the merchant location. In some embodiments, the user 202 exiting the merchant location without selecting a resource indicates user acceptance of the preferred resource to provide the total resource amount to the merchant.

As illustrated in FIG. 1, the inventory system 330 generally comprises a communication device 332, a processing device 334, and a memory device 336, wherein the processing device 334 is operatively coupled to the communication device 332 and memory device 336. Further, the memory device 336 comprises data storage 338 computer-readable instructions 340, which in some embodiments includes the computer-readable instructions 340 of an inventory application 342. The inventory system 330 may use the communication device 332 to communicate over the network 201 with other systems and servers in the system environment 308, such as the user device 204, the communication enabled container 310, and the merchant gate device 350. In some embodiments, the inventory application 342 allows the inventory system 330 to communicate with the communication enabled container 310 and other systems in order to identify an item placed within the communication enabled container 310 and allow for inventory management and retention of that item.

In some embodiments, inventory management and retention may include identifying an item placed in or removed from the communication enabled container 310 and updating the merchant inventory database accordingly. In some embodiments, inventory management and retention may include identifying how many of a particular item are in stock at the merchant location and automatically ordering more of the particular item if an amount of the particular item in stock falls below a predetermined threshold.

As illustrated in FIG. 1, the merchant gate device 350 generally comprises an identification sensor 352, a communication device 354, a processing device 356, and a memory device 358, wherein the processing device 356 is operatively coupled to the communication device 354 and memory device 358. Further, the memory device 358 comprises data storage 360 computer-readable instructions 362, which in some embodiments includes the computer-readable instructions 362 of a merchant gate application 364. The merchant gate device 350 may use the communication device 354 to communicate over the network 201 with other systems and servers in the system environment 308, such as the user device 204, the communication enabled container 310, and the inventory system 330. In some embodiments, the merchant gate application 364 allows the merchant gate device 350 to communicate with the communication enabled container 310 and other systems in order to receive and confirm a total resource amount required by the merchant. In some embodiments of the invention, the merchant gate 350 device is a merchant point-of-transaction device 210 and can be used to process and complete the transaction.

FIG. 2 illustrates a competitive proposal system environment 200, in accordance with one embodiment of the present invention. As illustrated in FIG. 2, the competitive proposal system 208 is operatively coupled, via a network 201 to the user device 204, a merchant point-of-transaction device 210, and one or more resource manager systems 206. In this way, the competitive proposal system 208 can send and receive information to and from the user device 204, the merchant point-of-transaction device 210, and the one or more resource manager systems 206. FIG. 2 illustrates only one example of an embodiment of the system environment 200, and it will be appreciated that in other, one or more of the systems, devices, or servers may be combined into a single system, device, or server, or be made up of multiple systems, devices, or servers.

In some embodiments, the user 202 may have a user device 204. FIG. 2 illustrates the user device 204. The user device 204 may be, for example, a desktop personal computer, a mobile system, such as a cellular phone, smart phone, personal data assistant (PDA) wearable device, laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the one or more resource manager systems 206 and the competitive proposal system 208. As such, the communication device 212 generally comprises a modem, server, or other device for communicating with other devices on the network 201.

The user device 204 comprises computer-readable instructions 220 and data storage 218 stored in the memory device 216, which in some embodiments includes the computer-readable instructions 220 of a user application 222. In some embodiments, the user device 204 acts as an interface allowing the user 202 to interact with the communication enabled container 310, inventory system 330, and competitive proposal system 208. In some embodiments, the user application 222 allows the user 202 to view a displayed total or offer in real-time via the user device; select an offer or resource via the user device; communicate with the communication enabled container 310, the inventory system 330, the merchant gate device 350, competitive proposal system 208, and/or the merchant point-of-transaction device 210; and authorize a transaction for completion.

As further illustrated in FIG. 2, the competitive proposal system 208 generally comprises a communication device 246, a processing device 248, and a memory device 250. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the one or more resource manager systems 206, the merchant point-of-transaction device 210, the user device 204, the communication enabled container 310, the inventory system 330, and the merchant gate device 350. As such, the communication device 246 generally comprises a modem, server, or other device for communicating with other devices on the network 201.

As further illustrated in FIG. 2, the competitive proposal system 208 comprises computer-readable instructions 254 stored in the memory device 250, which in one embodiment includes the computer-readable instructions 254 of a competitive proposal application 258. In some embodiments, the memory device 250 includes data storage 252 for storing data related to the system environment 200, but not limited to data created and/or used by the competitive proposal application 258.

Embodiments of the competitive proposal system 208 may include multiple systems, servers, computers or the like maintained by one or many entities. FIG. 2 merely illustrates one of those systems that, typically, interacts with many other systems to form a cloud-based network. In one embodiment of the invention, the competitive proposal system 208 is operated by an entity that acts as a resource manager to the user. In some embodiments, the competitive proposal system 208 is operated by an entity that is separate or does not act as a resource manager.

The processing device 248 is configured to use the communication device 246 to gather data, such as data corresponding to user information, transactions, or proposals offered by resource managers. The processing device 248 stores the data that it receives in the memory device 250.

In the embodiment illustrated in FIG. 2 and described throughout much of this specification, the competitive proposal application 258 may gather information related to the user and generate a user-specific profile, request term change proposals from resource managers, and create a ranked list of resources to present to the user for completing a transaction.

In some embodiments, the competitive proposal application 258 identifies resources associated with the user 202. Furthermore, the competitive proposal application 258 may identify the resource managers that are responsible for maintaining, housing, or otherwise managing the resources associated with the user 202.

In some embodiments, the competitive proposal application 258 generates a user-specific competitive proposal profile by first pushing a user profile to the user 202 in order to acquire user preferences. The competitive proposal application 258 sends a command signal to a user device 204 via a network 201 to display a graphical user interface comprising the user profile wherein the user profile comprises fields to be completed by the user 202. In some embodiments, the user profile is transmitted by the competitive proposal application 258 to a user device 204 associated with the user 202. The user profile is completed by the user 202, and upon completion, the user profile is transmitted, via a network 201, by the user device and received by the competitive proposal application 258. Subsequently, the user profile is processed by the competitive proposal application 258, wherein processing the user profile comprises extracting, compiling, and formatting user-inputted data so as to be presented via a graphical user interface.

In some embodiments, the competitive proposal application 258 uses information contained within the user profile to identify user accounts and one or more resource managers associated with the user accounts. The user accounts may be financial accounts such as a savings account, checking account, credit card account and/or the like. Account information such as account identifying numbers, credit card numbers, account manager and/or the like is obtained from the user profile completed by the user 202. In some embodiments, the user 202 on the user device 204 authorizes the competitive proposal application 258 to access the user accounts associated with the user 202 on the resource manager systems 206. The competitive proposal application 258 receives the account information associated with the user accounts directly from the one or more resource manager systems 206 via a network 201.

In some embodiments of the invention, the competitive proposal application 258 may be maintained by a financial institution that also manages one or more accounts of the user 202, and the account information is already known by the financial institution without the user 202 needing to provide the account information in the user profile. In some embodiments, the user accounts may be nonfinancial accounts such as social media accounts, wherein the competitive proposal application 258 gathers nonfinancial information about the user 202 from a social media account profile associated with the user 202.

In some embodiments, the competitive proposal application 258 stores the user-specific competitive proposal profile on a cloud network 301 as further illustrated in FIG. 3. In some embodiments, the cloud network is maintained by the competitive proposal application 258. In some embodiments, the network 201 is the cloud network. In other embodiments the competitive proposal application 258 stores the user-specific competitive proposal profile in the memory device 250 of the competitive proposal system 208. Access to the user-specific competitive proposal profile is provided to the resource manager systems 206 by the competitive proposal application 258 via a network 201 during the competitive proposal process allowing the one or more resource manager systems 206 access over a network 201 to the user preferences and historic trends associated with the user 202 in order for the one or more resource managers to offer a competitive proposal that may be seen as attractive to the user 202. In some embodiments of the invention, the user-specific competitive proposal profile is transmitted by the competitive proposal application 258 via a network 201 to the one or more resource manager systems 206 and stored on the resource manager systems 206, wherein user-specific competitive proposal profiles stored on the resource manager system 206 are updated in real-time by the competitive proposal application 258 via a network 201 as new information is transmitted to the competitive proposal application 258 from the user device 204 via a network 201.

In some embodiments, the competitive proposal application 258 allows the user 202 to modify the user-specific competitive proposal profile on the user device 204 associated with the user 202 ensuring that the user-specific competitive proposal profile contains current user preferences, historic trends, and resource managers associated with the user 202. Upon request by the user 202, the user-specific competitive proposal profile may be transmitted by the competitive proposal application 258 via a network 201 to the user device 204. Upon the user 202 updating the user-specific competitive proposal profile on the user device 204, the user-specific profile is transmitted back by the user device 204 and received by the competitive proposal application 258 and stored on the cloud network maintained by the competitive proposal application 258. In some embodiments of the invention, the user-specific profile may be stored on the user device 204 and received by the competitive proposal system 208 upon the user 202 updating the user-specific profile, wherein the user-specific profile with the current user preferences, historic trends, and resource managers associated with the user 202 may be transmitted to the resource manager systems 206 during the competitive proposal process. In some embodiments, the competitive proposal application 258 may automatically transmit the user-specific profile to the user device 204 in response to a predefined period of user inactivity, wherein the competitive proposal system 208 prompts the user 202 to update the user-specific profile and/or confirm that all user preferences, historic trends, and resource managers associated with the user 202 are current. Upon the user 202 updating and/or confirming the user-specific profile, the user-specific profile is transmitted via a network 201 by the user device 204 and received by the competitive proposal application 258, wherein the user-specific profile with the current user preferences, historic trends, and resource managers associated with the user 202 may be transmitted to the resource manager systems 206 during the competitive proposal process.

In some embodiments, the competitive proposal application 258 may receive from the user device 204 a total resource amount required by the merchant for the transaction between the user 202 and the merchant at a merchant location. The communication enabled container 310 passing through the merchant gate device 250 triggers a payment process. In response to the triggering of the payment process, the total resource amount is transmitted by communication enabled container 310 via the user device 204 over a network 201 and received by the competitive proposal application 258. In some embodiments, the competitive proposal application 258 receives the total resource amount directly from the merchant via the merchant gate device 350 and/or the merchant point-of-transaction device 210 after the merchant receives the total from the communication enabled container 310.

In some embodiments, the competitive proposal application 258 is triggered to establish a communicable linkage with the resource manager systems 206 in response to receiving the total resource amount required by the merchant for the transaction between the user 202 and the merchant at the merchant location from the communication enabled container 310 passing through the merchant gate device 350 and initiating the transaction. The communicable linkage between the resource manager systems 206 and the competitive proposal application 258 is established in order to acquire term change proposals from the one or more resource managers, wherein the competitive proposal application 258 and the one or more resource manager systems 206 transmit and receive data from one another via a network 201 during the competitive proposal process.

The competitive proposal application 258 requires all systems and devices participating in the competitive proposal process to implement an application program interface (API) and an accessible cloud service with appropriate security capable of sending and/or receiving proposals as defined by a manager of the competitive proposal management system.

In some embodiments, the competitive proposal application 258 generates a ranked list of the resources associated with the term change proposals from the one or more resource managers. In some embodiments of the invention, generating a ranked list of resources from the one or more resource managers further comprises analyzing the user preferences, wherein the user preferences include a preferred form of reward, and/or discount such as cash back, more reward points, lower interest rates, and/or the like provided to the user 202 by an associated resource relative to current terms set forth by the one or more resource managers upon selection of the associated resource to complete the transaction.

In some embodiments of the invention, generating a ranked list of the resources associated with the term change proposals from the one or more resource managers comprises generating a confidence score for each of the resources on the ranked list, wherein the confidence score comprises a confidence of the user employing a specific resource for providing the total resource amount to the merchant and completing the transaction. The confidence score is based on weighted factors, wherein the weight factors may include in descending order of weight value: user preferences, past transaction data, historic trends, and/or location data associated with the user 202.

In some embodiments, the competitive proposal application 258 transmits the ranked list of resources to the user device 204 associated with the user 202 via a network 201. The competitive proposal application 258 transmits a command signal to the user device 204 causing it to display a graphical user interface containing the ranked list of resources.

In some embodiments, the competitive proposal application 258 allows the user to select a resource from the ranked list of resources on the graphical user interface to provide the total resource amount to the merchant and complete the transaction. In some embodiments of the invention, the competitive proposal application 258 automatically selects a first resource on the ranked list and transmits the first resource to the merchant point-of-transaction device 210 via a network to complete the transaction. In other embodiments of the invention, the competitive proposal system 208 identifies a first resource on the ranked list of resources with a confidence score that meets or exceeds a predetermined confidence limit and transmits the first resource on the ranked list to the merchant point-of-transaction device 210 for providing the total resource amount to the merchant and completing the transaction.

In some embodiments, the competitive proposal application 258 transmits the ranked list of resources to the user device 204 associated with the user 202. The competitive proposal application 258 transmits a command signal to the user device 204 causing it to display a graphical user interface containing the ranked list of resources and allowing for the user 202 to select a resource from the ranked list and complete the transaction.

As illustrated in FIG. 2, the merchant point-of-transaction device 210 generally comprises a communication device 272, a processing device 274, and a memory device 276, wherein the processing device 274 is operatively coupled to the communication device 272 and memory device 276. Further, the memory device 276 comprises data storage 278 computer-readable instructions 280, which in some embodiments includes the computer-readable instructions 280 of a merchant application 282. The merchant point-of-transaction device 210 may use the communication device 272 to communicate over the network 201 with other systems and servers in the system environment 200, such as the user device 204, the resource manager systems 206, the competitive proposal system 208, the communication enabled container 310, the inventory system 330, and the merchant gate device 350. In some embodiments, the merchant application 282 allows the merchant point-of-transaction device 210 to communicate with the user device 204, and/or other systems in order to receive a resource for completion of a transaction and to complete the processing of the transaction. In some embodiments, the merchant gate device 350 acts as a merchant point-of-transaction device 210.

The resource manager systems 206 generally comprise a communication device 236, a processing device 238, and a memory device 240, wherein the processing device 238 is operatively coupled to the communication device 236 and memory device 240. Further, the memory device 240 comprises data storage 242 computer-readable instructions 244, which in some embodiments includes the computer-readable instructions 244 of a resource manager application 246. The resource manager systems 206 may use the communication device 236 to communicate over the network 201 with other systems and servers in the system environment 200, such as the user device 204, the merchant point-of-transaction device 210, and the competitive proposal system 208. In some embodiments, the resource manager application 246 allows the resource manager systems 206 to communicate with the competitive proposal system 208 in order to receive proposal requests and transmit proposals. The resource manager system 206 is associated with a resource manager that provides a resource with established terms to the user 202, wherein a resource is an account of the user, and/or a payment device associated with an account of the user such as accounts that have cash or cash equivalents, a credit card and associated credit card account, a debit card and associated banking account, and the like.

FIG. 3 illustrates a cloud-based competitive proposal system environment 300, in accordance with some embodiments of the invention. In some embodiments, a cloud network 301 is maintained and managed by the competitive proposal system 208. The cloud network 301 comprises the competitive proposal system 208, user device 204, merchant point-of-transaction device 210, and the resource manager systems 302. In some embodiments, the cloud network 301 may further comprise the merchant gate device 350, wherein the merchant gate device 350 is also a merchant point-of-transaction device 210. As illustrated in FIG. 2, in some embodiments, the cloud network can comprise one or more resource manager systems, wherein the one or more resource manager systems are operated and maintained by different resource managers. In other embodiments, a resource manager may provide multiple resource manager systems 302 to be included in the cloud network 301. Through the cloud network 301, the competitive proposal system 208 may provide access to networks, servers, processing capabilities, storage, services, and the like for other systems on the network 201. In some embodiments, information can be stored and processed on the cloud network 301 instead of a local computing device such as the user device 204, wherein memory and processing capabilities of the local computing device remain unaffected.

FIG. 4 provides a high level process flow for item identification and transaction completion by a communication enabled container system 500. As illustrated by block 502, a communication enabled container 310 is generated. The communication enabled container 310 comprises a receptacle with integrated computer technology including one or more identification sensors 312 used for collecting information related to items placed in the communication enabled container 310. The communication enabled container 310 is generated by inserting a chip, comprising the computer technology, specifically designed for functions as described herein for recognition of items being positioned within the container. In some embodiments, the communication enabled container 310 is designed to only sense and scan items within the confines of the communication enabled container 310 in order to prevent additional items not selected by the user 202 from being scanned and included in the transaction.

In some embodiments, the communication enabled container 310 may be disposable. In some embodiments, the communication enabled container 310 may be owned and maintained by a merchant or a separate third party and assigned to the user 202 upon entering the merchant location. In other embodiments, the communication enabled container 310 is owned by the user 202 and not the merchant, but may communicate with the merchant in order to perform the functions listed herein. In some embodiments, the communication enabled container 310 is owned by the user 202 and may be taken to and used at any compatible merchant location, wherein the communication enabled container 310 and the inventory system 330 associated with the merchant location may communicate with one another.

In some embodiments of the invention, the communication enabled container is a portable receptacle carried by the user 202 while shopping such as a bag or basket. In other embodiments, the communication enabled container 310 is a shopping cart, buggy, or the like operated by the user 202. In some embodiments the communication enabled container 310 includes a display allowing information to be presented to the user 202 by the communication enabled container 310 instead of the user device 204.

In other embodiments of the invention, a wrist or hand-based mobile device containing an identification sensor in communication with the user device 204 and/or communication enabled container 310 is worn by the user 202 and identifies an item for purchase, wherein an item is picked up by the user 202 wearing the wrist or hand-based mobile device, scanned by the wrist or hand-based mobile device, and recognized by the sensor system to be in a "shopping state," wherein the item is being considered by the user 202 and not yet selected for purchase. In some embodiments, the wrist or hand-based mobile device performs the functions of the communication enabled container 310, wherein upon scanning an item, the wrist or hand-based mobile device will communicate with the inventory system 330 to receive item information associated with the selected item prior to the item being placed in the communication enabled container 310. In some embodiments, while in the "shopping state," the user device 204 may display offers or competitor prices associated with the selected item, providing the user 202 with information to aid in an item selection decision. Once the item is placed into the communication enabled container 310 and scanned by the one or more identification sensors 312 associated with the communication enabled container 310, the item is recognized by the sensor system to be in a "purchasing state," wherein the item has been selected for purchase by the user 202 to be included in the transaction and any offers or pricing associated with the selected item presented to the user during the selection process are applied to the total of the transaction. In some embodiments, the wrist or hand based mobile device and the user device 204 are the same device.

As illustrated in block 504, the communication enabled container 310 establishes a communicable linkage to the user device 204 and the inventory system 330 over the network 201 allowing for the transmission of information between the devices. This linkage is triggered by identification of the communication enabled container 310 being located within the merchant location. In some embodiments, wherein the communication enabled container 310 is owned by the user 202, the communication enabled container 310 and/or the user device 204 may identify the user 202 to the merchant upon the user 202 entering the merchant location and the communication enabled container 310 establishing a communicable linkage with the user device 204 and the inventory system 330. In some embodiments, the communication enabled container 310 and user device 204 may communicate directly using NFC or similar forms of wireless communication without the use of the network 201.

As illustrated in block 506 of FIG. 4, the communication enabled container 310 identifies one or more items positioned within the communication enabled container 310. This process is further illustrated in FIG. 5 which provides a process flow for retrieving identifying information associated with the one or more items 1000.

As illustrated in block 1002 of FIG. 5, after the generation of the communication enabled container 1002, the communication enabled container 310 scans the one or more items positioned within the communication enabled container 310 for one or more identifiers associated with each item, as illustrated in block 1004. The one or more identifiers may be a barcode, a UPC, a SKU, information associated with a RFID enabled tag, and/or the like. For example, the user 202 may place a box of cereal in the communication enabled container 310, wherein the one or more identification sensors 312 scans the box of cereal for an identifier such as a barcode as the box is being placed in the communication enabled container 310.

As illustrated in block 1006, the communication enabled container 310 transmits the one or more identifiers associated with the one or more items in the communication enabled container 310 to the inventory system 330 for identification. The one or more identifiers associated with the one or more items are used to identify each item from a merchant inventory database maintained by the inventory system 330. In some embodiments, the inventory system 330 is maintained and operated by the merchant. In other embodiments of the invention, the inventory system 330 is maintained and operated by a separate third party and not by the merchant.

As illustrated in block 1008 of FIG. 5, the communication enabled container 310 extracts item information related to the one or more items positioned within the communication enabled container 310 from the inventory system 330, wherein item information comprises a resource amount (such as a total price for the item, including tax) offers (such as coupons, discounts, and price matching), manufacturer information, and/or the like associated with the one or more items. The communication enabled container 310 uses the item information to identify the one or more items in the communication enabled container 310, as illustrated in block 1010. For example upon receiving an identifier from the communication enabled container 310, the inventory system 330 matches the identifier to a specific box of a certain brand of cereal. The inventory system 330 may retrieve price, offers, manufacturer, and the like associated with the box of cereal.

In some embodiments, the item information related to the one or more items positioned within the communication enabled container 310 may further comprise competitor prices associated with the selected item from competing merchants, providing the user 202 with information to aid in the item selection decision. In some embodiments, the user 202 is able to select the option for a price match from the original merchant to a competitor price, wherein the discount is presented to the user 202. In some embodiments, competitor prices are provided by the competitive proposal system 208. In other embodiments, competitor prices are provided by the inventory system 330.

Referring now back to FIG. 4, as illustrated in block 508 of FIG. 4, after identifying the item, the communication enabled container 310 transmits and displays to the user 202 the prices of the one or more items in real-time as a total resource amount required by the merchant via the user device 204. The total resource amount required by the merchant is displayed on the user device via a graphical user interface. In some embodiments, the total resource amount is presented to the user as audio played through speakers or headphones associated with the user device 204. As illustrated in block 510 of FIG. 4, the sensor system may identify that the communication enabled container 310 is passing through the merchant gate device 350 after the user 202 has finished selecting items and adding them to the communication enabled container 310. A triggering event occurs when the communication enabled container 310 identifies the proximity of the merchant gate device 350 through wireless communication such as NFC, RFID, or the like. In some embodiments, location of the communication enabled container 310 within the merchant location is determined by GPS and is used to determine the proximity of the communication enabled container 310 to the merchant gate device 350.

In some embodiments, the user 202 may wish to include the items in more than one communication enabled container 310 in a single transaction. Upon the merchant gate device 350 detecting the more than one communication enabled container 310, the user 202 is notified of the presence of multiple communication enabled containers 310 and is prompted to select the communication enabled containers 310 that the user 202 wishes to include in the transaction. In some embodiments, the user is shown the contents of each individual communication enabled container 310 when prompted for a selection. In some embodiments, the user 202 is notified and prompted for a selection via the user device 204. In other embodiments, the user 202 is notified and prompted via the merchant point-of-transaction device 210. In yet other embodiments, the user 202 is notified and prompted via a display associated with a communication enabled container 310.

Based on the communication enabled container 310 passing through the merchant gate device 350, a communicable linkage is triggered to determine a preferred resource to provide the total resource amount required by the merchant to complete the transaction as illustrated in block 512 of FIG. 4. In some embodiments, the communicable linkage is generated to allow the communication enabled container 310 to transmit and receive information to and from the competitive proposal system 208 via the user device 204. In some embodiments, the triggering of the communicable linkage causes communication of the communication enabled container 310 to the competitive proposal system 208. In some embodiments, the triggering of the communicable linkage causes communication of the user device 204 to the competitive proposal system 208. In some embodiments, the triggering of the communicable linkage causes communication of the merchant gate device 350 to the competitive proposal system 208. In some embodiments triggering the communicable linkage causes communication of the merchant point-of-transaction device 210 to the competitive proposal system 208. In some embodiments triggering the communicable linkage causes communication of the competitive proposal system 208 to the resource manager systems 206 to begin the competitive proposal process.

As illustrated in block 514 of FIG. 4, the communication enabled container 310 uses the established communicable linkage to transmit the total resource amount required by the merchant to complete the transaction to the competitive proposal system 208 to allow for resource manager bidding. Additionally, the communication enabled container 310 transmits the total resource amount to the merchant gate device 250. The merchant gate device 250 uses an identification sensor 352 to scan the one or more items in the communication enabled container 310 and confirm the total resource amount transmitted by the communication enabled container 310. Furthermore, the merchant gate device 350 scans for any additional items not included in the total resource amount to prevent miscalculation of the total resource amount.

As illustrated in block 516 of FIG. 4, the transmission of the preferred resource to provide the total resource amount to the merchant complete the transaction is required. The preferred resource is received from the competitive proposal system 208 via the user device 204 and is pushed by the user device 204 to the merchant for completion of the transaction. In some embodiments, the user device 204 may push the resource to the communication enabled container 310. In some embodiments, the user device 204 may push the resource to the merchant gate device 350. In some embodiments, the user device 204 may push the resource to the merchant point-of-transaction device. In other embodiments, the competitive proposal 208 may push the preferred resource directly to the merchant via the merchant point-of-transaction device and/or the merchant gate device.

In some embodiments of the invention, the preferred resource is automatically selected to provide the total resource amount required by the merchant without any input from the user 202. In other embodiments, the user 202 is prompted by the user device 204 to select a resource from a ranked list of resources to provide the total resource amount required by the merchant and complete the transaction. In yet another embodiment of the invention, the preferred resource is automatically selected to provide the total resource amount to the merchant if the user 202 does not select a resource from the ranked list of resources in a predetermined amount of time, such as within 1 hour after the user 202 has walked out of the merchant location. In some embodiments, the user 202 exiting the merchant location without selecting a resource indicates user acceptance of the preferred resource to provide the total resource amount to the merchant.

In some embodiments of the invention, the merchant gate device 350 includes a security checkpoint such as an automatic security gate, wherein the automatic security gate opens when the merchant gate device 350 recognizes that the transaction has been completed, no additional items not included in the transaction are detected, and the correct total amount of resources required by the merchant has been provided to the merchant.

FIG. 6 provides a process flow for inventory management and item retention 1100, in accordance with some embodiments of the invention. As illustrated in block 1102 of FIG. 6, the inventory system 330 first generates a database of store inventory, wherein the database contains information related to items maintained by the merchant at the merchant location such as a number of items currently in stock, location of the items, prices of the items, manufacturer information, offers associated with the items, and/or the like.

As illustrated in block 1104 of FIG. 6, a communicable linkage is generated between the communication enabled container 310 and the inventory system 330 allowing for the communication enabled container 310 and the inventory system 330 to transmit and receive data to and from one another.

As illustrated in block 1106 of FIG. 6, the inventory system 330 receives from the communication enabled container 310 an indication that an item has been placed in the communication enabled container 310. The indication that the item has been placed in the communication enabled container 310 may be in the form of one or more identifiers associated with the item transmitted from the communication enabled container 310, wherein the one or more identifiers may be a barcode, a UPC, a SKU, information associated with a RFID enabled tag, GPS location, and/or the like. As illustrated in block 1108 of FIG. 6, based on receiving the indication that the item was placed in the communication enabled container 310, the inventory system 330 updates the database of store inventory to reflect a current number of items in stock at the merchant location. For example, a user 202 shopping at a grocery store may select a can of soup from a shelf and place it into a communication enabled container 310. The inventory system 330 receives an identifier associated with the can of soup from the communication enabled container 310, identifies the item, and subtracts the can of soup from the database of store inventory.

As illustrated in block 1110 of FIG. 6, the inventory system may also receive an indication from the communication enabled container 310 that an item previously placed in the communication enabled container 310 has been removed. The indication that the item has been removed from the communication enabled container 310 may be in the form of one or more identifiers associated with the removed item transmitted from the communication enabled container 310, wherein the one or more identifiers may be a barcode, a UPC, a SKU, information associated with a RFID enabled tag, GPS location, and/or the like.

As illustrated in block 1112 of FIG. 6, the inventory system 330 identifies a location associated with the item removed from the communication enabled container 310. The location associated with the item is determined by receiving a GPS location of the communication enabled container 310 associated with the item being removed. For example, the user 202 may remove the can of soup from the communication enabled container 310. The location of the communication enabled container 310 where the can of soup was removed is transmitted to the inventory system 330 allowing the removed can to be located and restocked in the correct location.

As illustrated in block 1114 of FIG. 6, based on receiving the indication that the item was removed from the communication enabled container 310, the inventory system 330 updates the database of store inventory to reflect a current number of items in stock at the merchant location maintained. For example, the inventory system 330 receives an identifier associated with the can of soup removed from the communication enabled container 310, identifies the item, and adds the can of soup back into the database of store inventory.

In some embodiments of the invention, the inventory system 330 identifies from an updated merchant inventory database that the stock of a particular item has fallen below a predetermined threshold. In response to determining that the stock has fallen below the predetermined threshold, the inventory system 330 may automatically order more of the particular item in order to replenish the stock of the particular item.

As illustrated in block 1116 of FIG. 6, the inventory system 330 transmits a communication of the location of the item removed from the communication enabled container 310 to a merchant associate for item retention and restocking. Upon the item being returned to the proper location within the merchant location by a merchant associate, the item is scanned by the merchant associate using a sensor-equipped merchant associate device in communication with the inventory system 330, and the store inventory 330 updates the database of store inventory to reflect the location of the now properly located item.

In some embodiments of the invention, information regarding the GPS location of removed items, the number of items selected for purchase by users, the number of items remaining in the store inventory may be used to evaluate the performance of the merchant associate's efficiency restocking the items at the merchant location and correctly relocating removed items.

In some embodiments of the invention, an item is no longer desired to be included in the transaction and is removed from the communication enabled container 310 by the user 202 at the merchant gate device 350. The item is first identified by the communication enabled container 310 and inventory system 330 as previously discussed. The user 202 places the unwanted item in an area on the point-of-transaction device designated for returns such as a platform, chute, conveyor belt, or the like. The returned item is scanned by the point-of-transaction device in the designated return area as being returned, reintroduced into the store inventory, and designated to be restocked by a merchant associate as previously discussed.

In some embodiments of the invention, information regarding what unwanted items are removed from the communication enabled container 310 for return can be used to track user preferences for specific items or brands. This information can be utilized to update the user-specific profile used by the competitive proposal system 208.

In other embodiments, information regarding what items are removed from the communication enabled container 310 can be used to track the effectiveness of a sale by determining if items in container are replaced by competing items included in the sale after the user 202 has been made aware of the sale. In some embodiments of the invention, the existence of a sale on a competing item is transmitted to the user 202 via the user device 204 upon the user 202 selecting an item for purchase. For example, the user 202 selects a bottle of ketchup for purchase. After determining that the user 202 has selected the bottle of ketchup for purchase, the communication enabled container 310 and inventory system 330 transmit an offer for a competing brand of ketchup on sale to the user 202 via the user device 204. The sale is determined to be effective if after viewing the offer, the user 202 removes the bottle of ketchup from the communication enabled container 310 and replaces it with the competing bottle of ketchup associated with the sale.

FIG. 7 provides a process flow for identifying items and retrieving associated offers 900. As illustrated in block 902 of FIG. 7, a communication enabled container 310 is generated. The communication enabled container 310 comprises a receptacle with integrated computer technology including one or more identification sensors 312 used for collecting information related to items placed in the communication enabled container 310. The communication enabled container 310 is generated by inserting a chip, comprising the computer technology, specifically designed for functions as described herein for recognition of items being positioned within the container.

As illustrated in block 904 of FIG. 7, the communication enabled container 310 identifies items positioned inside the communication enabled container 310. The communication enabled container 310 scans identifiers associated with the items, transmits the identifiers to the inventory system 330, and extracts item information from the inventory system 330 in order to accurately identify the items.

As illustrated in block 906 of FIG. 7, offers associated with the identified item are received via the user device 204 from the inventory system 330, wherein the offers comprise discounts, coupons, and/or the like associated with the identified item. In some embodiments, the offers may be stored on the inventory system 330, while in other embodiments, the inventory system 330 may communicate directly with a manufacturer associated with the item over a network and receive offers in real-time. In some embodiments, the inventory system 330 transmits offers related to similar items provided by competing manufacturers.

As illustrated in block 908 of FIG. 7, the offers are presented to the user 202 via the user device, wherein the offers are displayed on the user device 204 via a graphical user interface. In some embodiments of the invention, multiple offers are displayed as a list on the user device 204. In other embodiments, the offers are presented to the user 202 as audio via speakers or headphones associated with the user device 204.

As illustrated in block 910 of FIG. 7, the user 202 is allowed to select offers via the user device 204. The user 202 is prompted to accept or decline the offers presented by the user device 204. In some embodiments, an offer is automatically selected without input from the user 202.

Finally, as illustrated in block 912 of FIG. 7, the selected offers are applied to the total resource amount required by the merchant in real-time allowing the user 202 to know the exact total amount required by the merchant before proceeding to a merchant point-of-transaction device to complete the transaction. For example, the user 202 selects a can of soup and places it in the communication enabled container 310. The can of soup is identified by the inventory system 330 and offers associated with the can of soup are transmitted to the user 202 via the user device 204. The user 202 is presented with an offer for a discount on the soup. The user 202 accepts the discount on the user device 204 and the discount is applied to the total resource amount required by the merchant.

In some embodiments of the invention, the inventory system 330 is triggered to transmit offers to the user 202 via the user device 204 upon recognizing that the item selected by the user 202 is in a "shopping state," wherein the user 202 picks up an item but does not yet place the item in the communication enabled container 310 while wearing a wrist or hand based mobile device in communication with the user device 204 and/or communication enabled container 310.

FIG. 8 provides a high level process flow for completing a transaction between a user and a merchant using a cloud-based competitive proposal service management system 100, in accordance with one embodiment of the present invention. As illustrated by block 102, the competitive proposal system 208 identifies resources associated with the user 202. Furthermore, the competitive proposal system 208 may identify the resource managers that are responsible for maintaining, housing, or otherwise managing the resources associated with the user 202. In some embodiments of the invention, the one or more resource managers are financial institutions that provide and manage one or more credit cards, debit cards, lines of credit and/or the like to the user 202. In some embodiments, the resources are the one or more credit cards, debit cards, lines of credit and/or the like that the financial institutions provide to the user 202. For example, a resource manager may be a bank or a credit card company that provides and manages a credit card to the user 202. In other embodiments, the resources associated with the user 202 are identified from accounts associated with the user 202 extracted and/or identified by the competitive proposal system 208.

As illustrated by block 104 of FIG. 8, the competitive proposal system 208 generates a user-specific competitive proposal profile.

The generation of a user-specific competitive proposal profile is further illustrated in FIG. 9. As illustrated in FIG. 9 which provides a process flow for generating a user-specific competitive proposal profile 600, the competitive proposal system 208 generates the user-specific competitive proposal profile in block 602 by first pushing a user profile to the user 202 in order to acquire user preferences as illustrated in block 604. The user profile comprises fields to be completed by the user 202. For example, the user profile may contain fields for user input such as a name, address, phone number, email address, social media account information, preferred form of reward, financial account information and/or the like. In some embodiments, the user profile is transmitted by the competitive proposal system 208 to a user device 204 associated with the user 202. The user profile is completed by the user 202, and upon completion, the user profile is transmitted and received by the system from the user device 204. Subsequently, the user profile is processed by the competitive proposal system 208, wherein processing the user profile comprises extracting, compiling, and formatting user-inputted data so as to be presented via a graphical user interface.

As illustrated by block 606 in FIG. 9, the competitive proposal system 208 processes the user profile and receives the user preferences, wherein the user preferences comprise preferences of the user 202 for a specific form of reward, and/or discount such as cash back, reward points, lower interest rates, and/or the like. For example, the user 202 may state in response to a prompt in the user profile that he/she prefers to receive cash back rather than reward points for a transaction.

As illustrated in block 608 in FIG. 9, the process 600 continues by identifying user accounts and resource managers associated with the accounts. As such, the competitive proposal system 208 uses information contained within the user profile to identify user accounts and one or more resource managers associated with the user accounts. The user accounts may be financial accounts such as a savings account, checking account, credit card account and/or the like. Account information such as account identifying numbers, credit card numbers, account manager and/or the like is obtained from the user profile completed by the user 202. For example, the user 202 may complete the user profile and provide information regarding a credit card associated with the user 202 and a credit card company that manages an account associated with the credit card. In some embodiments, the user 202 authorizes the competitive proposal system 208 to access the user accounts associated with the user 202, and the competitive proposal system 208 receives the account information associated with the user accounts directly from the one or more resource managers. In some embodiments of the invention, the competitive proposal system 208 may be maintained by a financial institution that also manages one or more accounts of the user 202, and the account information is already known by the financial institution without the user 202 needing to provide the account information in the user profile. In some embodiments, the user accounts may be nonfinancial accounts such as social media accounts, wherein the competitive proposal system 208 gathers nonfinancial information about the user 202 from a social media account profile associated with the user 202.

As illustrated in block 610 of FIG. 9, the competitive proposal system 208 extracts information contained within the user profile to identify historic trends associated with the user accounts. The system 208 may extract transaction purchase amounts, date and time of a transaction, location of a transaction, items included in a transaction and the like associated with a user account in order to identify historic trends.

Historic trends may include, for example, but are not limited to a proclivity of the user 202 for purchasing a specific brand of an item, a frequency that the user 202 shops at a merchant location, an average total amount of money spent by the user 202 while shopping at a merchant location, other behavioral tendencies of the user 202, and/or the like. For example, the competitive proposal system 208 may recognize from past transactions associated with a user account that the user 202 has travelled a certain number of times over a time period and associate a tendency to travel with the user 202. In some embodiments, wherein the user account is a social media account, the competitive proposal system 208 may identify trends from a social media account associated with the user 202 by recognizing words or phrases frequently employed by the user 202, wherein the words or phrases may be an item brand name, a merchant name or location, and/or the like. The competitive proposal system 208 may also identify trends from the social media account associated with the user 202 by recognizing pages on a social media platform associated with the social media account that have been made favorite by the user 202. For example, the competitive proposal system 208 may identify a proclivity of the user 202 for a certain brand of an item by recognizing that the user 202 "liked" the page on the social media platform associated with the certain brand of the item.

As illustrated in block 612 of FIG. 9, the competitive proposal system 208 uses collected information associated with the user 202 to generate a user-specific competitive proposal profile for the user 202 based on the user preferences, historic trends, and the one or more resource managers associated with the user 202. Access to the user-specific competitive proposal profile is provided to the one or more resource managers by the competitive proposal system 208 during a competitive proposal process.

As seen in block 614 of FIG. 9, the process 600 continues by storing the user-specific competitive proposal profile on a cloud network 301 as seen in FIG. 3. In some embodiments, the cloud network 301 is maintained by the competitive proposal system 208. Access to the user-specific competitive proposal profile is provided to the resource manager systems 206 by the competitive proposal system 208 during the competitive proposal process allowing the one or more resource managers access to the user preferences and historic trends associated with the user 202 in order for the one or more resource managers to offer a competitive proposal that may be seen as attractive to the user 202. In some embodiments of the invention, the user-specific competitive proposal profile is transmitted to the one or more resource managers and stored on the resource manager systems 206, wherein user-specific competitive proposal profiles stored on the resource manager system 206 are updated in real time by the competitive proposal system 208 as new information associated with the user becomes available to ensure that the one or more resource managers are able to provide competitive proposals that may be seen as attractive to the user 202 based on recent information associated with the user 202. In other embodiments, aspects of the user-specific competitive proposal profile is kept private from the resource managers. The competitive proposal system 208 may not allow the resource managers to access the user preferences and instead matches the user-specific competitive profile to received offers from the resource managers.

As illustrated in block 616 of FIG. 9, the competitive proposal system 208 allows the user 202 to modify the user-specific competitive proposal profile on the user device 204 associated with the user 202 ensuring that the user-specific competitive proposal profile contains current user preferences, historic trends, and resource managers associated with the user 202. Upon request by the user 202, the user-specific competitive proposal profile may be transmitted by the competitive proposal system 208 to the user device 204. Upon the user 202 updating the user-specific competitive proposal profile on the user device 204, the user-specific profile is received by the competitive proposal system 208 and stored on the cloud network 301 maintained by the competitive proposal system 208. In some embodiments of the invention, the user-specific profile may be stored on the user device 204 and received by the competitive proposal system 208 upon the user 202 updating the user-specific profile, wherein the user-specific profile with the current user preferences, historic trends, and resource managers associated with the user 202 may be provided to the resource manager systems 206 during the competitive proposal process. In some embodiments, the competitive proposal system 208 may automatically transmit the user-specific profile to the user device 204 in response to a predefined period of user inactivity, wherein the competitive proposal system 208 prompts the user 202 to update the user-specific profile and/or confirm that all user preferences, historic trends, and resource managers associated with the user 202 are current. Upon the user 202 updating and/or confirming the user-specific profile, the user-specific profile is received by the competitive proposal system 208, wherein the user-specific profile with the current user preferences, historic trends, and resource managers associated with the user 202 may be provided to the resource manager systems 206 during the competitive proposal process.

Referring back to FIG. 8, as illustrated in block 106, after generating the user-specific competitive proposal profile 104, the process 100 continues by receiving at the competitive proposal system 208 from the user device 204 a total resource amount required by the merchant for the transaction between the user 202 and the merchant at a merchant location. The communication enabled container 310 passes through the merchant gate device 350 initiating the transaction and triggering a payment process. In response to the triggering of the payment process, the total resource amount is received by the competitive proposal system 208 from the user device 204 via network communication. In some embodiments, the competitive proposal system 208 receives the total resource amount from the communication enabled container 310. In some embodiments, the competitive proposal system 208 receives the total resource amount directly from the merchant via the merchant gate device 350 and/or the merchant point-of-transaction device 210.

As illustrated in block 108 of FIG. 8 the competitive proposal system 208 is triggered to establish a communicable linkage with the resource manager systems 206 in response to the communication enabled container 310 passing through the merchant gate device 350 and transmitting the total resource amount required by the merchant for the transaction between the user 202 and the merchant at the merchant location to the competitive proposal system 208. The communicable linkage between the resource manager systems 206 and the competitive proposal system 208 is established in order to acquire term change proposals from the one or more resource managers, wherein term change proposals comprise changes to pre-established payment terms between the user 202 and the one or more resource managers such as interest rates, amount of cash back earned by the user 202, amount of reward points earned by the user 202, and/or the like. For example, a resource manager may propose to the user 202 a lower interest rate for the transaction relative to a pre-established interest rate in return for the user 202 choosing to complete the transaction using a credit card associated with the resource manager.

The competitive proposal system 208 requires all systems and devices participating in the competitive proposal process to implement an application program interface (API) and an accessible cloud service with appropriate security capable of sending and/or receiving proposals as defined by a manager of the competitive proposal management system.

As illustrated in block 112, the competitive proposal system 208 generates a ranked list of the resources associated with the term change proposals from the one or more resource managers. In some embodiments of the invention, generating a ranked list of resources from the one or more resource managers further comprises analyzing the user preferences, wherein the user preferences include a preferred form of reward, and/or discount such as cash back, more reward points, lower interest rates, and/or the like provided to the user 202 by an associated resource relative to current terms set forth by the one or more resource managers upon selection of the associated resource to complete the transaction. For example, if the user-specific competitive proposal profile states that the user 202 prioritizes lower interest rates over cash back, the competitive proposal system 208 will rank a resource that provides a lower interest rate over a resource that provides cash back.

In some embodiments of the invention, generating a ranked list of the resources associated with the term change proposals from the one or more resource managers comprises generating a confidence score for each of the resources on the ranked list, wherein the confidence score comprises a confidence of the user employing a specific resource for providing the total resource amount to the merchant and completing the transaction. The confidence score is based on weighted factors, wherein the weight factors may include in descending order of weight value: user preferences, past transaction data, historic trends, and/or location data associated with the user 202. Based on generated confidence scores for the resources, the competitive proposal system 208 may identify a first resource on the ranked list that possesses a confidence score that meets or exceeds a predetermined confidence limit. The first resource on the ranked list of resources may be transmitted to the user device 204.

As illustrated in block 114, the competitive proposal system 208 transmits the ranked list of resources to the user device 204 associated with the user 202. The competitive proposal system 208 transmits a command signal to the user device 204 causing it to display a graphical user interface containing the ranked list of resources.

As illustrated in block 116, the competitive proposal system 208 allows the user to select a resource from the ranked list of resource to provide the total resource amount to the merchant and complete the transaction. In some embodiments of the invention, the competitive proposal system 208 automatically selects a first resource on the ranked list and completes the transaction. In some embodiments of the invention, the competitive proposal system 208 identifies a first resource on the ranked list of resources with a confidence score that meets or exceeds a predetermined confidence limit and transmits the first resource on the ranked list to the merchant gate device 350 and/or the merchant point-of-transaction device for providing the total resource amount to the merchant and completing the transaction.

FIG. 10 provides a process flow for requesting, receiving, and transmitting term change proposals from the resource managers 700. As illustrated in block 702, the competitive proposal system 208 is triggered to establish a communicable linkage with the resource manager systems 206 in response to receiving the total resource amount required by the merchant for the transaction between the user 202 and the merchant at the merchant location. The communicable linkage between the resource manager systems 206 and the competitive proposal system 208 is established in order to acquire term change proposals from the one or more resource managers, wherein term change proposals comprise changes to pre-established payment terms between the user 202 and the one or more resource managers such as interest rates, amount of cash back earned by the user 202, amount of reward points earned by the user 202, and/or the like.

As illustrated in block 704 of FIG. 10, based on the triggering the establishment of the communicable linkages with the resource manager systems 206 caused by the communication enabled container 310 passing through the merchant gate device 350 and initiating the transaction, the competitive proposal system 208 requests the term change proposals from the resource manager systems 206 for the resources associated with the one or more resource managers and the user 202. The competitive proposal system 208 allows the one or more resource managers to access the user-specific competitive proposal profile stored in the cloud and to use the information contained within the user-specific profile to offer attractive and competitive proposals to the user 202. In some embodiments of the invention, the competitive proposal system 208 also requests offers from one or more resource managers not associated with the user 202 to compete with the term change proposals provided by the one or more resource managers already associated with the user 202. For example, the competitive proposal system 208 may request an offer for terms associated with a new credit card from a credit card company not already associated with the user 202 to compete with the term changes provided by credit card companies already associated with the user 202, wherein the user 202 may sign-up for the new credit card and complete the transaction with the new credit card.

As illustrated in block 706 of FIG. 10, the competitive proposal system 208 receives the term change proposals transmitted from the one or more resource managers. In some embodiments of the invention, receiving the term change proposals from the one or more resource managers through the communicable linkage between the competitive proposal system 208 and the resource manager systems 206 comprises a confidential bidding process, wherein the one or more resource managers submit a single, private term change proposal for a resource associated with the user 202 for completing the transaction between the user 202 and the merchant. The one or more resource managers are unaware of offers proposed by competitor resource managers during the competitive proposal process. In some embodiments, receiving the term change proposals from the one or more resource managers through the communicable linkage between the competitive proposal system 208 and the resource manager systems 206 comprises a public auction, wherein, after offering initial term change proposals, the one or more resource managers may be notified of a currently pending term change proposal from a competitor resource manager. In response, the one or more resource managers not offering the currently pending term change proposal for completing the transaction between the user 202 and the merchant and providing the total resource amount to the merchant may offer additional term change proposals to compete with the currently pending term change proposal.

As illustrated in block 708, the competitive proposal system 208 generates a ranked list of the resources associated with the term change proposals from the one or more resource managers.

FIG. 11 further illustrates the process of generating a ranked list of resources provided by the one or more resource managers 800, wherein the process is used to generate the ranked list as seen in block 802. The process begins with the competitive proposal system 208 first comparing term change proposals provided by the resource managers to the user preferences contained within the user-specific competitive proposal profile as seen in block 804. As illustrated in block 806, the system 208 attempts to match the user-specific competitive proposal profile with term change proposals offered by the one or more resource managers based on the user preferences. After determining a match, the competitive proposal system 208 in block 808 determines the term change proposals that offer the highest amount of user-preferred offer based on the user preferences. For example, if the user 202 specified a preference for a rebate on an item as a preferred form, the system 208 will determine the term change proposal that provides the highest rebate amount. As illustrated in block 810, based on comparing the term change proposals with the user preferences and determining which matched term change proposals offer the highest amount of user-preferred offer, the competitive proposal system 208 ranks the term change proposals provided by the resource managers and subsequently generates a list of the ranked term change proposals as illustrated in blocks 810 and 812 respectively.

Referring back to FIG. 10, as illustrated in block 710, the competitive proposal system 208 transmits the ranked list of resources to the user device 204 associated with the user 202. The competitive proposal system 208 transmits a command signal to the user device 204 causing it to display a graphical user interface containing the ranked list of resources.

FIG. 12 provides a high level process flow for a user 202 interacting with the identification sensor system environment 308 at a merchant location 1200, in accordance with one embodiment of the invention. As illustrated in block 1202, the user 202 first enters the merchant location. In some embodiments, the communication enabled container belongs to the user 202 and is brought to the merchant location by the user 202. In other embodiments, the communication enabled container 310 is provided by the merchant to the user 202 at the merchant location.

As illustrated in block 1204 of FIG. 12, the user 202 shops at the merchant location, selects an item, and places it into the communication enabled container 310. After placing the item in the communication enabled container 310, the user 202 receives offers associated with the item on the user device 204 and is prompted to select an offer to apply to the total resource amount required by the merchant as illustrated in block 1206 of FIG. 12. Additionally, the total resource amount required by the merchant is presented to the user 202 via the user device 204 in real-time as the user 202 continues to add more items to the communication enabled container 310 and select offers associated with the more items while shopping at the merchant location.

After adding all desired items to the communication enabled container 310, the user 202 passes through the merchant gate device 350 as illustrated in block 1208 of FIG. 12. The user 202 is not required to remove the items from the communication enabled container 310 as the merchant gate device 350 scans the items in the communication enabled container 310 as they pass through the gate 350 and confirms the total resource amount required by the merchant received from the communication enabled container 310.

As illustrated in block 1210 of FIG. 12, the user 202 is prompted by the user device 204 to select a resource from a ranked list of resources to complete the transaction. The user selects a resource from the ranked list and completes the transaction as illustrated in block 1212 of FIG. 12.

Finally, the user 202 exits the merchant location with any purchased items after completing the transaction as illustrated in block 1214 of FIG. 12.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with generating communicable linkages for providing a cloud-based competitive proposal system 208.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for generating communicable linkages for providing a cloud-based competitive proposal system 208, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
| --- | --- | --- |
| 15/078,359 | GENERATING COMMUNICABLE LINKAGES FOR A CLOUD-BASED COMPETITIVE PROPOSAL SYSTEM | Mar. 23, 2016 |

What is claimed is:

1. An identification sensor system providing real-time inventory communication and management, the system comprising:
   a computer apparatus including a processor, a memory device, a communication device, and a reader device; and a software module stored in the memory, comprising computer-readable instructions that when executed by the processor cause the processor to:
   generate a communication enabled container, wherein the communication enabled container comprises a receptacle which comprises one or more identification sensors for collecting information related to items placed in the receptacle;
   link, upon triggering of identification of the communication enabled container being within a merchant location, the communication enabled container with a user device associated with a user;
   scan, upon an item being positioned within the receptacle of the communication enabled container, one or more identifiers associated with the item via the one or more identification sensors;
   extract item information associated with the item from an inventory system based on an identification of the one or more identifiers matching item identifiers stored in a database on the inventory system, wherein the item information comprises a resource amount for the item, offers associated with the item, and manufacturer information associated with the item;
   trigger communication with a competitive cloud based proposal network to identify and acquire term change proposals from one or more resource managers separate from the merchant for the item positioned within the communication enabled container, wherein the term change proposals comprise changes to pre-established payment terms including a change in interest rate, change in amount of cash back earned by the user, and change in amount of reward points earned by the user;
   display, in real-time via a display on the user device, a total resource amount required by the merchant for all of the items in the communication enabled container; identify the communication enabled container passing through a merchant gate device; trigger a communicable linkage for the user to: (a) select the communication enabled container that the user selects to include in a transaction and (b) provide a preferred resource to satisfy the total resource amount required by the merchant or the one or more resource managers;
   perform a subsequent scan and identify, by using the one or more identifiers associated with the items, that a subset of one or more items is removed from the communication enabled container; transmit geolocation information for the subset of one or more items removed from the communication enabled container to the merchant;
   and require, based on triggering the communicable linkage for determining the preferred resource, a transmission of the preferred resource to the merchant to provide the total resource amount required based on the item positioned within the communication enabled container and the acquire term change proposals.

2. The system of claim 1, wherein triggering the communicable linkage for determining a preferred resource to provide the total resource amount required by the merchant further comprises:
   identifying user resources and one or more resource managers associated with the identified user resources;
   generating a user-specific competitive proposal profile, wherein the user-specific competitive proposal profile comprises user resources, user preferences, historic resource trends, and resource manager terms for resource use;
   triggering a communicable linkage with the one or more resource managers based on receiving a determined total resource amount required by a merchant;
   opening the communicable linkage with the one or more resource managers for resource manager term change proposals for providing the total resource amount to the merchant;
   receiving term change proposals from the one or more resource managers through the communicable linkage;
   generating a ranked list of resources from the one or more resource managers for providing the total resource amount to the merchant, wherein the ranked list of resources further comprise an order of preferred term changes relative to the user preferences;
   transmitting the ranked list of resources from the one or more resource managers to the user device; and
   allowing user selection of one of the ranked list of resources for providing the total resource amount to the merchant.

3. The system of claim 1, wherein extracting item information associated with the item from the inventory system further comprises:
   generating a database of store inventory, wherein the database contains information related to items maintained by the merchant at a merchant location such as a number of items currently in stock, location of the items, prices of the items, manufacturer information associated with the items, and/or offers associated with the items;

generating a communicable linkage with the communication enabled container;

receiving from the communication enabled container an indication of the item being placed in the communication enabled container;

updating, based on receiving the indication of the item being placed in the communication enabled container, the database of store inventory;

receiving from the communication enabled container an indication of the item being removed from the communication enabled container; and updating, based on receiving the indication of the item being removed from the communication enabled container, the database of store inventory.

4. The system of claim 3, wherein updating the store inventory further comprises:

identifying from the database of store inventory that stock of a particular item has fallen below a predetermined threshold; and ordering automatically, based on identifying from the database of store inventory that the stock of the particular item has fallen below the predetermined threshold, more of the particular item.

5. The system of claim 1, wherein receiving from the communication enabled container an indication of the item being removed from the communication enabled container comprises receiving a GPS location of the communication enabled container associated with the location that the item is removed.

6. The system of claim 1, wherein extracting item information associated with the item from the inventory system further comprises:

extracting one or more offers associated with the item from the inventory system;

presenting the one or more offers associated with the item to the user via the user device;

allowing the user to select one or more offers via the user device; and applying a user-selected offer to the total resource amount required by the merchant.

7. The system of claim 6, wherein presenting the one or more offers associated with the item to the user via the user device comprises presenting the total resource amount required by the merchant to the user in an audio format via speakers or headphones associated with the user device.

8. The system of claim 1, wherein displaying the total resource amount required by the merchant in real-time via a user device comprises presenting the total resource amount required by the merchant to the user in an audio format via speakers or headphones associated with the user device.

9. The system of claim 1, wherein requiring a transmission of the preferred resource to the merchant to provide the total resource amount required by the merchant comprises prompting the user to select the preferred resource from a ranked list of resources on a user device.

10. The system of claim 1, wherein requiring a transmission of the preferred resource to the merchant to provide the total resource amount required by the merchant comprises automatically, after a pre-determined period of time, selecting the preferred resource to provide the total resource amount if the user does not select a resource from a ranked list of resources in a predetermined amount of time.

11. The system of claim 1, wherein the merchant gate device is also a merchant point-of-transaction device.

12. The system of claim 1, wherein the communication enabled container further comprises a display device.

13. A computer program product for an identification sensor system providing real-time inventory communication and management, the computer program product comprising at least one non-transitory computer-readable medium having computer-readable program code portions embodied therein, the computer-readable program code portions comprising:

an executable portion configured for generating a communication enabled container, wherein the communication enabled container comprises a receptacle which comprises one or more identification sensors for collecting information related to items placed in the receptacle;

an executable portion configured for linking, upon triggering of identification of the communication enabled container being within a merchant location, the communication enabled container with a user device associated with a user;

an executable portion configured for scanning, upon an item being positioned within the receptacle of the communication enabled container, one or more identifiers associated with the item via the one or more identification sensors;

an executable portion configured for extracting item information associated with the item from an inventory system based on an identification of the one or more identifiers matching item identifiers stored in a database on the inventory system, wherein the item information comprises a resource amount for the item, offers associated with the item, and manufacturer information associated with the item;

an executable portion configured for triggering communication with a competitive cloud based proposal network to identify and acquire term change proposals from one or more resource managers separate from the merchant for the item positioned within the communication enabled container, wherein the term change proposals comprise changes to pre-established payment terms including a change in interest rate, change in amount of cash back earned by the user, and change in amount of reward points earned by the user; an executable portion configured for displaying, in real-time via a display on the user device, a total resource amount required by the merchant for all of the items in the communication enabled container; an executable portion configured for identifying the communication enabled container passing through a merchant gate device;

an executable portion configured for triggering a communicable linkage for the user to: (a) select the communication enabled container that the user selects to include in a transaction and (b) provide a preferred resource to satisfy the total resource amount required by the merchant or the one or more resource managers;

perform a subsequent scan and identify, by using the one or more identifiers associated with the items, that a subset of one or more items is removed from the communication enabled container; transmit geolocation information for the subset of one or more items removed from the communication enabled container to the merchant;

and an executable portion configured for requiring, based on triggering the communicable linkage for determining the preferred resource, a transmission of the preferred resource to the merchant to provide the total resource amount required based on the item positioned within the communication enabled container and the acquire term change proposals.

14. The computer program product of claim 13, wherein triggering the communicable linkage for determining a preferred resource to provide the total resource amount required by the merchant further comprises:
identifying user resources and one or more resource managers associated with the identified user resources;
generating a user-specific competitive proposal profile, wherein the user-specific competitive proposal profile comprises user resources, user preferences, historic resource trends, and resource manager terms for resource use;
triggering a communicable linkage with the one or more resource managers based on receiving a determined total resource amount required by a merchant;
opening the communicable linkage with the one or more resource managers for resource manager term change proposals for providing the total resource amount to the merchant;
receiving term change proposals from the one or more resource managers through the communicable linkage;
generating a ranked list of resources from the one or more resource managers for providing the total resource amount to the merchant, wherein the ranked list of resources further comprise an order of preferred term changes relative to the user preferences;
transmitting the ranked list of resources from the one or more resource managers to the user device; and
allowing user selection of one of the ranked list of resources for providing the total resource amount to the merchant.

15. The computer program product of claim 13, wherein extracting item information associated with the item from the inventory system further comprises:
generating a database of store inventory, wherein the database contains information related to items maintained by the merchant at a merchant location such as a number of items currently in stock, location of the items, prices of the items, manufacturer information associated with the items, and/or offers associated with the items;
generating a communicable linkage with the communication enabled container;
receiving from the communication enabled container an indication of the item being placed in the communication enabled container;
updating, based on receiving the indication of the item being placed in the communication enabled container, the database of store inventory;
receiving from the communication enabled container an indication of the item being removed from the communication enabled container; and
updating, based on receiving the indication of the item being removed from the communication enabled container, the database of store inventory.

16. The computer program product of claim 15, wherein updating the store inventory further comprises:
identifying from the database of store inventory that stock of a particular item has fallen below a predetermined threshold; and
ordering automatically, based on identifying from the database of store inventory that the stock of the particular item has fallen below the predetermined threshold, more of the particular item.

17. A computer-implemented method for an identification sensor system providing real-time inventory communication and management, the method comprising:
generating a communication enabled container, wherein the communication enabled container comprises a receptacle which comprises one or more identification sensors for collecting information related to items placed in the receptacle;
linking, upon triggering of identification of the communication enabled container being within a merchant location, the communication enabled container with a user device associated with a user;
scanning, upon an item being positioned within the receptacle of the communication enabled container, one or more identifiers associated with the item via the one or more identification sensors;
extracting item information associated with the item from an inventory system based on an identification of the one or more identifiers matching item identifiers stored in a database on the inventory system, wherein the item information comprises a resource amount for the item, offers associated with the item, and manufacturer information associated with the item;
triggering communication with a competitive cloud based proposal network to identify and acquire term change proposals from one or more resource managers separate from the merchant for the item positioned within the communication enabled container, wherein the term change proposals comprise changes to pre-established payment terms including a change in interest rate, change in amount of cash back earned by the user, and change in amount of reward points earned by the user;
displaying, in real-time via a display on the user device, a total resource amount required by the merchant for all of the items in the communication enabled container;
identifying the communication enabled container passing through a merchant gate device; triggering a communicable linkage for the user to: (a) select the communication enabled container that the user selects to include in a transaction and (b) provide a preferred resource to satisfy the total resource amount required by the merchant or the one or more resource managers; perform a subsequent scan and identify, by using the one or more identifiers associated with the items, that a subset of one or more items is removed from the communication enabled container; transmit geolocation information for the subset of one or more items removed from the communication enabled container to the merchant; and requiring, based on triggering the communicable linkage for determining the preferred resource, a transmission of the preferred resource to the merchant to provide the total resource amount required based on the item positioned within the communication enabled container and the acquire term change proposals.

18. The computer-implemented method of claim 17, wherein triggering the communicable linkage for determining a preferred resource to provide the total resource amount required by the merchant further comprises:
identifying user resources and one or more resource managers associated with the identified user resources;
generating a user-specific competitive proposal profile, wherein the user-specific competitive proposal profile comprises user resources, user preferences, historic resource trends, and resource manager terms for resource use;

triggering a communicable linkage with the one or more resource managers based on receiving a determined total resource amount required by a merchant;

opening the communicable linkage with the one or more resource managers for resource manager term change proposals for providing the total resource amount to the merchant;

receiving term change proposals from the one or more resource managers through the communicable linkage;

generating a ranked list of resources from the one or more resource managers for providing the total resource amount to the merchant, wherein the ranked list of resources further comprise an order of preferred term changes relative to the user preferences;

transmitting the ranked list of resources from the one or more resource managers to the user device; and allowing user selection of one of the ranked list of resources for providing the total resource amount to the merchant.

19. The computer-implemented method of claim 17, wherein extracting item information associated with the item from the inventory system further comprises:

generating a database of store inventory, wherein the database contains information related to items maintained by the merchant at a merchant location such as a number of items currently in stock, location of the items, prices of the items, manufacturer information associated with the items, and/or offers associated with the items;

generating a communicable linkage with the communication enabled container;

receiving from the communication enabled container an indication of the item being placed in the communication enabled container;

updating, based on receiving the indication of the item being placed in the communication enabled container, the database of store inventory;

receiving from the communication enabled container an indication of the item being removed from the communication enabled container; and updating, based on receiving the indication of the item being removed from the communication enabled container, the database of store inventory.

20. The computer-implemented method of claim 19, wherein updating the store inventory further comprises:

identifying from the database of store inventory that stock of a particular item has fallen below a predetermined threshold; and ordering automatically, based on identifying from the database of store inventory that the stock of the particular item has fallen below the predetermined threshold, more of the particular item.

* * * * *